US007980450B2

(12) United States Patent
Swoboda et al.

(10) Patent No.: US 7,980,450 B2
(45) Date of Patent: Jul. 19, 2011

(54) DISPOSABLE PRESSWARE PREPARED FROM WAX-INFUSED PAPERBOARD

(75) Inventors: Dean P. Swoboda, De Pere, WI (US); Thomas W. Zelinski, Menasha, WI (US)

(73) Assignee: Dixie Consumer Products LLC, Atlanta, GA (US)

( * ) Notice: Subject to any disclaimer, the term of this patent is extended or adjusted under 35 U.S.C. 154(b) by 188 days.

(21) Appl. No.: 12/348,099

(22) Filed: Jan. 2, 2009

(65) Prior Publication Data

US 2009/0173776 A1 Jul. 9, 2009

Related U.S. Application Data

(60) Provisional application No. 61/009,994, filed on Jan. 4, 2008.

(51) Int. Cl.
*B65D 1/34* (2006.01)
*B32B 27/10* (2006.01)

(52) U.S. Cl. ....... 229/5.85; 229/406; 229/407; 428/34.2

(58) Field of Classification Search ................. 229/5.85, 229/406, 407; 428/34.2; 220/574; 206/524.3
See application file for complete search history.

(56) References Cited

U.S. PATENT DOCUMENTS 1,417,916 A * 5/1922 House ............................ 229/4.5
2,943,991 A * 7/1960 Tench et al. ...................... 208/21
2,988,528 A * 6/1961 Tench et al. .................... 524/479
3,144,971 A * 8/1964 Wommelsdorf .............. 229/400
3,251,709 A * 5/1966 Bonzagni ....................... 428/486
3,369,932 A * 2/1968 Sawyer, Jr. et al. ........ 427/374.4
3,450,327 A * 6/1969 Ludder ........................ 229/5.85
4,609,140 A 9/1986 Van Handel et al.
4,721,500 A 1/1988 Van Handel et al.
4,826,714 A * 5/1989 King ............................ 428/34.2
4,832,676 A 5/1989 Johns et al.
5,088,640 A 2/1992 Littlejohn
5,249,946 A 10/1993 Marx
5,326,020 A 7/1994 Cheshire et al. ........... 229/2.5 R
5,776,619 A 7/1998 Shanton ......................... 428/511
5,938,112 A 8/1999 Sandstrom .................... 229/407
6,039,682 A 3/2000 Dees et al. ....................... 493/58
6,186,394 B1 2/2001 Dees et al. ............... 229/122.34
6,287,247 B1 9/2001 Dees et al. ....................... 493/58
6,379,497 B1 4/2002 Sandstrom et al. ........... 162/123
6,474,497 B1 11/2002 Littlejohn et al.
6,585,506 B1 7/2003 Johns et al.
6,589,043 B1 7/2003 Johns et al.
6,592,357 B1 7/2003 Johns et al.
6,663,925 B1 * 12/2003 Swoboda ..................... 428/34.2
6,715,630 B2 4/2004 Littlejohn et al.
6,733,852 B2 5/2004 Littlejohn et al.
6,740,373 B1 * 5/2004 Swoboda et al. ............ 428/34.2
6,893,693 B2 5/2005 Swoboda et al. ............ 428/34.2
6,919,111 B2 7/2005 Swoboda et al. ............ 428/34.2
7,048,176 B2 5/2006 Littlejohn et al.

(Continued)

*Primary Examiner* — Gary E Elkins
(74) *Attorney, Agent, or Firm* — William W. Letson

(57) ABSTRACT

A disposable servingware container press-formed from paperboard includes (a) a bottom panel; (b) an annular transition portion; and (c) an outer portion extending upwardly and outwardly with respect to the transition portion, the container having an outer surface and an inner surface distal to the outer surface, the inner surface being adapted as a serving surface. The paperboard is infused with a wax composition on one side thereof in an amount of at least 3 lbs of wax per 3000 $ft^2$ ream such that the paperboard is partially saturated with wax and has a wax-enriched layer proximate one side thereof and a layer undersaturated with wax proximate the other side thereof.

30 Claims, 15 Drawing Sheets

U.S. PATENT DOCUMENTS

| | | | | |
|---|---|---|---|---|
| 7,282,273 | B2 | 10/2007 | Murphy et al. | 428/514 |
| 7,337,943 | B2 | 3/2008 | Johns et al. | |
| 2006/0208054 | A1 | 9/2006 | Littlejohn et al. | 229/406 |
| 2006/0254736 | A1 * | 11/2006 | Jackson et al. | 162/158 |
| 2007/0042072 | A1 | 2/2007 | Johns et al. | |
| 2008/0015098 | A1 | 1/2008 | Littlejohn et al. | |
| 2009/0114659 | A1 | 5/2009 | Littlejohn | |

* cited by examiner

DISPOSABLE PRESSWARE PREPARED FROM WAX-INFUSED PAPERBOARD

CLAIM FOR PRIORITY

This non-provisional application is based upon U.S. Provisional Patent Application Ser. No. 61/009,994, of the same title, filed Jan. 4, 2008. The priority of U.S. Provisional Patent Application Ser. No. 61/009,994 is hereby claimed and the disclosure thereof is incorporated into this application by reference.

TECHNICAL FIELD

The present invention relates to disposable pressware generally and more particularly to disposable pressware made with wax-infused paperboard, which is wax-loaded on one side. The wax, loading, paperboard, and forming processes are all selected and/or controlled such that the wax is absorbed into the paper fiber matrix such that there is an undersaturated layer adjacent the serving surface. Materials and conditions are selected such that the wax does not migrate all of the way to the surface of the board opposite wax application which is detrimental to the appearance of products.

BACKGROUND

Disposable servingware prepared from paperboard blanks are known in the art. There is disclosed, for example, a rigid paperboard container in U.S. Pat. No. 5,326,020 to Cheshire et al. The rim of this container has a particular configuration for rigidity and strength. See also, U.S. Pat. No. 5,938,112 to Sandstrom. During fabrication, the paperboard material for forming the container is impregnated with a starch at anywhere from about 5-12 lbs/3000 square foot ream in preferred commercial products. Waxes have been proposed as sizings and coatings for paper products, perhaps most frequently as a component along with a film-forming polymer.

For example, there is disclosed in U.S. Pat. No. 7,282,273 to Murphy et al entitled "Grease Resistance and Water Resistance Compositions and Methods" various wax and polyvinyl alcohol compositions as well as methods of making and applying them. Generally the techniques disclosed by Murphy et al. involve coating a substrate such as paper with wax and polyvinyl alcohol and optionally with a polyamine. The compositions are applied at coat weights ranging from about 0.05 to 2 lbs/3000 $ft^2$. See Col. 11, Example 1, lines 13-20. See also, Col. 9, lines 20 to 24.

Wax compositions are sometimes recited as sizing agents, for example, in the form of a wax emulsion. See U.S. Pat. No. 6,379,497 to Sandstrom et al. Col. 24, lines 19-24 as well as U.S. Pat. No. 6,919,111 to Swoboda et al. where it is noted that wax emulsions may be used as sizing agents. See Col. 20. Also noted is Col. 47, lines 35-51 of the '111 patent, example 8 wherein waxes are enumerated as part of a list of internal sizing agents. Wax is further disclosed as a spray coating for paper cups in the '111 patent. See Col. 37.

Despite the availability of waxes as a material for use in connection with disposable pressware, it has not heretofore been appreciated that wax can be used as a substitute for starch sizing of paperboard in paper plate manufacture, nor that a wax-infused paperboard container exhibits surprising wet strength while preserving aesthetics of a latex coated product if judiciously applied.

SUMMARY OF INVENTION

It has been found in accordance with the present invention that disposable serving containers with superior properties are made from paperboard infused with a wax composition on one side thereof such that the paperboard has a wax-infused layer enriched with wax proximate one side thereof and a layer undersaturated with wax proximate the other side. The containers are formed such that the wax-infused layer enriched with wax is proximate the outer surface of the container and the layer undersaturated in wax is proximate the inner, serving surface of the container. The serving surface is optionally provided with a latex clay coating and an overcoat in some embodiments. The paperboard is used in a hot forming process in a heated die set or may be used in a punch through process as hereinafter described.

The wax-infused layer enriched with wax may be saturated with wax, supersaturated with wax or undersaturated with wax. The layer undersaturated in wax may be wax-free or substantially wax-free, but does not transfer free wax to its proximate surface during wax infusion or subsequent forming of the container as is apparent from translucent "staining" of the serving surface (except at pleated areas in some cases noted below). Wax may be transferred to the inner surface of the container at the pleated areas due to scoring and increased heat and pressure in these areas as the containers are fabricated if a heated die set is used to form a pleated product.

Applying approximately 12-15 lbs/rm of melted (150° F.) paraffin wax into paperboard and subsequently forming that paperboard into 10" plates resulted in dry plate strength improvements of on the order of 50%, wet strength plate improvements of more than 100%, and tensile and taber stiffness paperboard property improvements of roughly 10-15%. This approach clearly distinguishes a new level of pressed paper plate performance within reasonable material and process manufacturing cost.

Without intending to be bound by theory, the properties observed in the products of the invention are believed to be a result of unique synergies between wax properties, cellulose fibers, a formed paperboard web, and plate forming conditions. Fluid wax has an affinity to absorb into cellulose fibers and those fibers can generally hold approximately 25-30 lbs/rm of wax weight at basis weights of interest for disposable servingware. It is difficult to remove the wax once held by the fiber even when hot/fluid. When cooled, the fibers themselves are stiffer and the bonds between fibers are reinforced with hardened wax. The wax impregnated fibers do not interfere with aqueous moistening required for heated pressware forming as do other fiber surface/film type coatings. During formation in a heated die set, the wax becomes fluid again under forming heat/pressure and does not interfere with board deflection. A translucent pleat area sometimes observed from the top side of the plate indicates the wax is both an internal and external part of the pleat. This total encompass of the pleat area with hardened wax prevents pleats from "popping" or opening during plate load, a deficiency in current products that leads inefficient strength development. If less translucence at the pleats is desired, reducing the forming pressure and/or heat in a heated die set can alleviate surface migration of the wax. Through a hot forming process, a wax impregnated board does not interfere with steam release during forming which could cause blistering; a problem with other types of film coatings applied to the backside of a plate that result in strength improvements. After forming, the wax hardens and reinforces the newly shaped paperboard. Microwave bacon testing confirms that no wax residue is deposited on toweling placed between the plate and the microwave turntable.

"Punch-Through" cold or hot forming techniques may also be used to form multiple containers per cycle from wax-infused paperboard if so desired.

Soybean waxes that are edible and environmentally friendly may be used if so desired.

Care must be exercised to ensure that the entire board is not saturated with wax, since a translucent appearance results. Ideally, the wax saturates the board from one surface to just under the opposite surface, eliminating unsized core area, but not saturating the serving surface of the container.

BRIEF DESCRIPTION OF DRAWINGS

The invention is described in detail below with reference to the various Figures, wherein like numerals designate similar parts and wherein.

DETAILED DESCRIPTION

Figure 1:
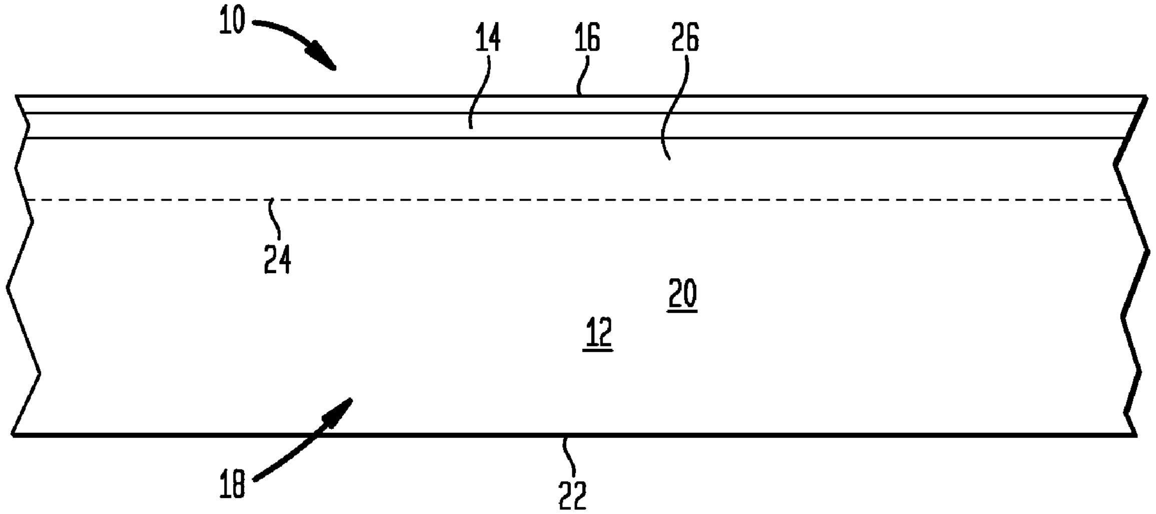
FIG. 1 is a schematic diagram showing a section of paperboard of the class utilized in connection with the present invention.

The invention is described in detail below with reference to numerous embodiments for purposes of exemplification and illustration only. Modifications to particular embodiments within the spirit and scope of the present invention, set forth in the appended claims, will be readily apparent to those of skill in the art.

As used herein, terminology is given its ordinary meaning unless a more specific definition is given or the context indicates otherwise. Disposable containers of the present invention generally have a characteristic diameter. For circular bowls, plates, platters and the like, the characteristic diameter is simply the outer diameter of the product. For other shapes, an average diameter can be used; for example, the arithmetic average of the major and minor axes could be used for elliptical shapes, whereas the average length of the sides of a rectangular shape is used as the characteristic diameter and so forth. Sheet or paperboard stock refers to both a web or roll of material and to material that is cut into sheet form for processing. Unless otherwise indicated, "mil", "mils" and like terminology refers to thousandths of an inch and dimensions appear in inches. Likewise, caliper is the thickness of material and is expressed in mils unless otherwise specified. Basis weight is expressed in lbs per 3000 square foot ream.

Dimensions, radii of curvature, angles and so forth are measured by using conventional techniques such as laser techniques or using mechanical gauges including gauges of curvature as well as by other suitable technique. While a particular arcuate section of a container may have a shape which is not perfectly arcuate in radial profile, perhaps having some other generally bowed shape either by design or due to off-center forming, or due to relaxation or springback of the formed paperboard, an average radius approximating a circular shape is used for purposes of determining radii such as R1, R2 or R0, for example. A radius of curvature may be used to characterize any generally bowed shape, whether the shape is arcuate or contains arcuate and linear segments or comprises a shape made up of joined linear segments in an overall curved configuration. In cases where directional variation around the container exists, average values are measured in a machine direction (MD1) of the paperboard, at 90° thereto, the cross-machine direction (CD1) of the paperboard as well as at 180° to MD1 and 180° to CD1. The four values are then averaged to determine the dimension or quantity.

While the distinction between a pressware "bowl" and "plate" is sometimes less than clear, especially in the case of "deep dish" containers, a bowl generally has a height to diameter ratio of 0.15 or greater, while a plate has a height to diameter ratio of less than 0.1 in most cases. A "platter" is a large shallow plate and may be oval or any shape other than round.

"Evert", "annular evert", "evert portion" and like terminology refers to an outwardly extending part of the inventive containers, the evert typically occurring at the outer flange of a container adjoining a transition from a downwardly sloping brim portion of the container.

"Rigidity" refers to SSI rigidity in grams at 0.5" deflection as hereinafter described.

"Rim Stiffness" refers to the Rim Stiffness in grams at 0.1" deflection as further discussed below.

Disposable servingware containers such as pressware paperboard containers typically are in the form of plates, both compartmented and non-compartmented, as well as bowls, trays, and platters. The products are typically round or oval in shape but can also be multi-sided, for example, hexagonal or octagonal.

"Wax" means and includes relatively low melting organic mixtures or compounds of relatively high molecular weight, solid at room temperature and generally similar in composition to fats and oils except that they contain little or no glycerides. Some waxes are hydrocarbons, others are esters of fatty acids and alcohols. Waxes are thermoplastic, but since they are not high polymers, are not considered in the family of plastics. Common properties include smooth texture, low toxicity, and freedom from objectionable odor and color. Waxes are typically combustible and have good dielectric properties. They are soluble in most organic solvents and insoluble in water. Typical classes of waxes are enumerated briefly below.

Natural waxes include carnauba waxes, paraffin waxes (which may also be synthetically prepared), montan waxes, and microcrystalline waxes. Paraffin wax is one preferred wax for use in the present invention. Any suitable type or grade of paraffin wax can be used. Paraffin waxes may be unbranched or sparsely branched, waxy white or colorless solid hydrocarbon mixtures that can be used to make candles, wax paper, lubricants, and sealing materials. The chemical composition of a suitable paraffin wax may be a mixture of predominantly nonaromatic saturated hydrocarbons with the general formula $C_nH(2n+2)$ where n is an integer between 12 and 50, and perhaps between 15 and 30. It is preferable that the paraffin or other wax has a melting point, or melting point range, between 40° C. to 100° C., such as from 50° C. to about 70° C.

Synthetic waxes include Fischer-Tropsch waxes and polyethylene waxes. Fischer-Tropsch waxes include methylene groups which can have either even or odd numbers of carbons. These waxes have molecular weights of 300-1400 gms/mole and are used in various applications. Polyethylene waxes are made from ethylene produced from natural gas or by cracking petroleum naptha. Ethylene is then polymerized to provide waxes with various melting points, hardnesses, and densities. Polyethylene wax molecular weights range from about 500-3000 gms/mole.

Wax loading is sometimes expressed herein in lbs of wax per 3000 $ft^2$ ream of paperboard or sometimes expressed in lbs of wax per lb-ream of paperboard. Paperboard having a basis weight of 200 lbs per 3000 $ft^2$ ream provided with 10 lbs of wax per 3000 $ft^2$ ream has a wax loading of 0.05 lb wax/lb ream of paperboard.

A suitable paraffin wax is Paravan® 1420 wax available from Exxon-Mobil. This wax was melted and applied to paperboard as a melt in place of starch in like amounts.

Paperboard Preparation

Paperboard was infused with hot wax (150° F.) using a conventional size press with a heated reservoir pan. The board was infused with wax on one side only using a 58 line, 25 billion cubic micron (bcw) electronic etched cylinder to obtain a wax weight of approximately 12 lbs/wax/3000 $ft^2$ of paperboard.

Before or after being infused with wax, the paperboard may be coated on the opposite side with a water-based coating applied over an inorganic pigment or other layer. Carboxylated styrene-butadiene resins may be used with or without filler if so desired. In addition, for esthetic reasons, the paperboard stock is often initially printed before being coated with an overcoat layer. A suitable multiple layer coating may include 2 pigment (clay) containing layers, with a binder, of about 6 lbs/3000 $ft^2$ ream or so followed by 2 acrylic layers of about 0.5-1 lbs/3000 $ft^2$ ream. The clay containing layers are provided first during board manufacture and the acrylic layers are then applied by press coating methods, i.e., gravure, coil coating, flexographic methods and so forth as opposed to extrusion or film laminating methods which are expensive and may require off-line processing as well as large amounts of coating material. An extruded film, for example, may require 25 lbs/3000 $ft^2$ ream. One suitable coating system is described in U.S. Pat. No. 6,893,693 to Swoboda et al. entitled "High Gloss Disposable Pressware", the disclosure of which is incorporated herein by reference. This class of coatings includes 2 clay containing layers each having a coatweight of from about 4 to about 12 lbs per 3,000 square foot ream. Particular pigmented coatings are described in U.S. Pat. No. 5,776,619 to Shanton. It will be appreciated that the coatweight of such clay coatings is predominately due to the weight of the clay.

Following the base coat or coatings, a first finish coating consisting essentially of a styrene-butadiene resin composition may be applied to the coated paperboard substrate. Any suitable styrene/butadiene containing resin composition may be used. A preferred resin composition includes a carboxylated styrene-butadiene resin. A particularly preferred resin is sold by Reichold under the trademark Tykote 96038-00.

After the first finish coating is applied a second finish coating consisting essentially of an acrylic resin composition is applied to the first finish coating. By acrylic coating it is meant that any suitable acrylic emulsion may be used. Such emulsions are generally polymers of acrylic acid or its derivatives and salts. Such compounds may include one or more of the following: polyacrylics and polyacrylic acids such as poly(benzyl acrylate), poly(butyl acrylate)(s), poly(2-cyanobutyl acrylate), poly(2-ethoxyethyl acrylate), poly(ethyl acrylate), poly(2-ethylhexyl acrylate), poly(fluoromethyl acrylate), poly(5,5,6,6,7,7,7-heptafluoro-3-oxaheptyl acrylate), poly(heptafluoro-2-propyl acrylate), poly(heptyl acrylate), poly(hexyl acrylate), poly(isobornyl acrylate), poly (isopropyl acrylate), poly(3-methoxybutyl acrylate), poly (methyl acrylate), poly(nonyl acrylate), poly(octyl acrylate), poly(propyl acrylate), poly(p-tolyl acrylate), poly(acrylic acid) and derivatives and salts thereof, polyacrylamides such as poly(acrylamide), poly(N-butylacrylamide), poly(N,N-dibutylacrylamide), poly(N-dodecylacrylamide), and poly (morpholylacrylamide); polymethacrylic acids and poly (methacrylic acid esters) such as poly(benzyl methacrylate), poly(octyl methacrylate), poly(butyl methacrylate), poly(2-chloroethyl methacrylate), poly(2-cyanoethyl methacrylate), poly(dodecyl methacrylate), poly(2-ethylhexyl methacrylate), poly(ethyl methacrylate), poly(1,1,1-trifluoro-2-propyl methacrylate), poly(hexyl methacrylate), poly(2-hydroxyethyl methacrylate), poly(2-hydroxypropyl methacrylate), poly(isopropyl methacrylate), poly(methacrylic acid), poly (methyl methacrylate) in various forms such as, atactic, isotactic, syndiotactic, and heterotactic; and poly(propyl methacrylate); polymethacrylamides such as poly(4-carboxyphenylmethacrylamide); other alpha- and beta-substituted poly(acrylics) and poly(methacrylics) such as poly(butyl chloracrylate), poly(ethyl ethoxycarbonylmethacrylate), poly(methyl fluoroacrylate), and poly(methyl phenylacrylate). Both finish coating layers should be FDA approved material.

The first finish coating layer and second top finish coating layer are typically water borne and press-applied, suitably by way of a printing-type apparatus. Suitable coating methods include gravure techniques, flexographic techniques, hydrophilic coating techniques, coil coating, trailing blade coating methods and so forth.

Referring to FIG. 1, there is shown a section of a paperboard structure 10 consisting of a paperboard core 12 of papermaking fibers as well as a clay coating 14 and a topcoat 16. Clay coating 14 may be printed with a decorative pattern if so desired as noted above. Paperboard core 12 is infused with wax on one side 18 to form a wax-infused layer 20 enriched with wax extending from lower (or outer) surface 22 to dotted line 24. Ideally, wax-infused layer 20 extends almost to clay coating 14 such that an undersaturated or wax-free layer 26 is very small in a preferred embodiment.

Structure 10 is preserved throughout the forming process described below, which is an unexpected result which preserves the aesthetics of the product.

After coating, the paperboard is cut into blanks and processed into pressware having a shape, for example, as described below as Profile 1. Further details are seen in copending U.S. patent application Ser. No. 12/259,487, filed Oct. 28, 2008, the disclosure of which is incorporated herein by reference. Other suitable shapes are described in U.S. Pat. No. 5,088,640 to Littlejohn; U.S. Pat. No. 5,326,020 to Chesire et al.; U.S. Pat. No. 6,715,630 to Littlejohn et al.; and United States Patent Application Publication No. US 2006/0208054 of Littlejohn et al., the disclosures of which are incorporated herein by reference in their entirety.

Profile 1

There are shown in FIGS. 2A through 2H various illustrations of a disposable container produced with a nano starch sized paperboard blank having the shape designated herein as Profile 1. A disposable food container in the form of a plate 60 has a characteristic diameter, D, a bottom panel 62 having an arched central crown 64 with a convex upper surface 64*a* as well as a first annular transition portion 66 which extends upwardly and outwardly from bottom panel 62. Upper surface 64*a* of arched central crown 64 defines a substantially continuous, convex arched profile 68 extending from a center 70 of container 60 toward first annular transition portion 66 for the (horizontal) distance 72 which is at least 75% of a horizontal distance 74 between center 70 of container 60 and first annular transition portion 66. In the various embodiments shown, the highest point of arched central crown 64 is shown at center 70. While this is typically a preferred geometry, the highest point of the arched crown may occur off-center due to forming a blank which is not perfectly aligned in a die set, or due to relaxation or spring back or by design. A sidewall portion 76 extends upwardly and outwardly from first annular transition portion 66. A second annular transition portion 78 flares outwardly with respect to first annular transition portion 66 and defines a second radius of curvature, R2, the ratio of R2/D generally being 0.0125 or less. A generally linear inner flange portion 80 extends to an outer flange portion 82 which, in turn, extends outwardly with respect to the second annular transition portion. The upwardly convex central crown has a crown height 84 of from about 0.05" to about 0.40".

As will be appreciated from the various diagrams, the crown height is the maximum distance of the crown above the lowermost portion of the profile that the crown rises. Typically, the crown height is defined at the center of the container.

Plate 60 also has a plurality of pleats such as pleats 86, 88, 90 and 92 which extend from first annular transition portion 66 to the outer edge of the container. Preferably, these pleats correspond to the scores of a scored paperboard blank and include a plurality of paperboard lamellae which are reformed into a generally inseparable structure which provides strength and rigidity to the container, as discussed in more detail hereinafter.

Figure 2B:
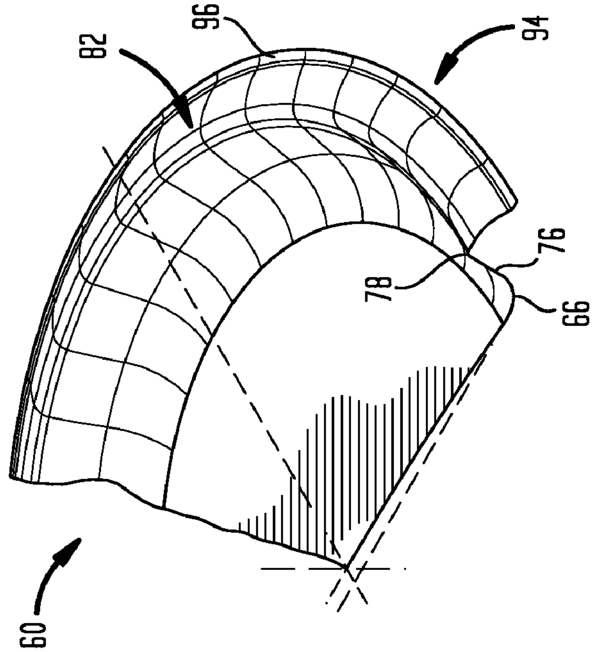
FIG. 2B is a partial view in perspective and section illustrating the geometry of the plate of FIG. 2A.
Figure 2A:
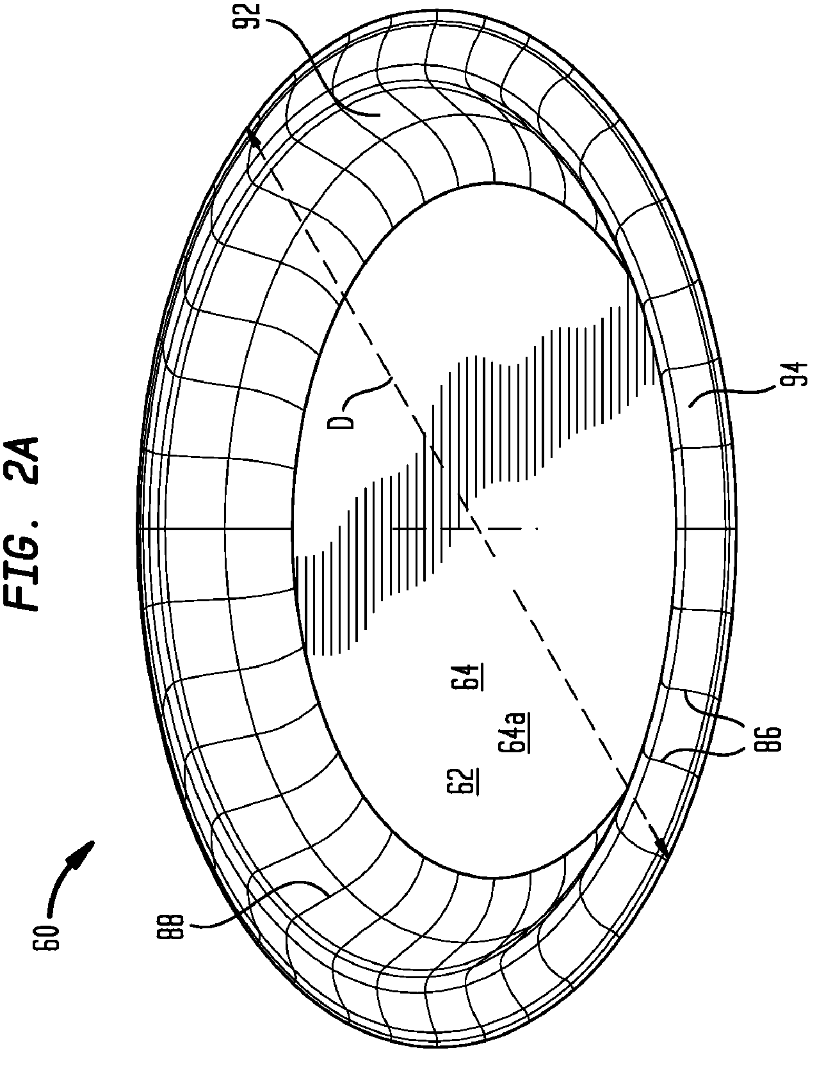
FIG. 2A is a view in perspective of a plate configured in accordance with the present invention.
Figure 2E:
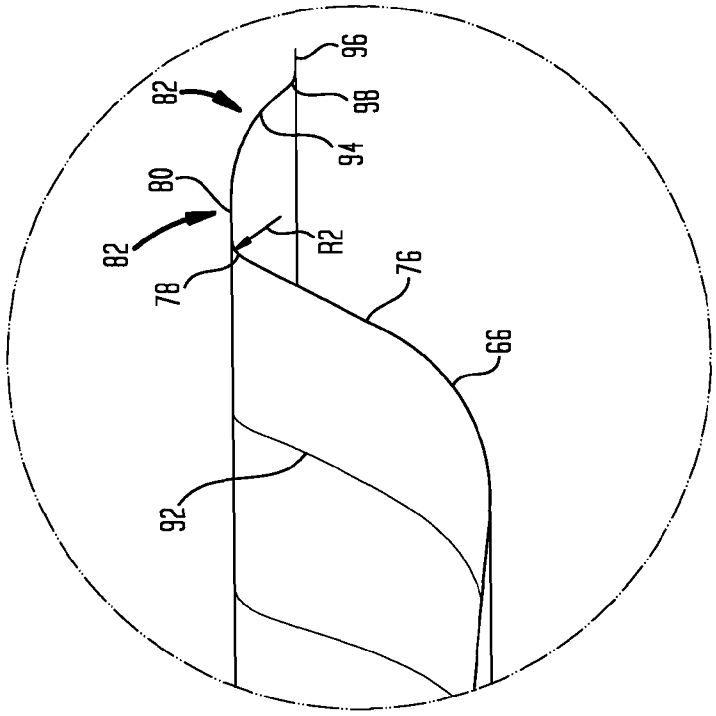
FIG. 2E is an enlarged detail illustrating the geometry of the disposable plate of FIGS. 2A-2D.
Figure 2C:
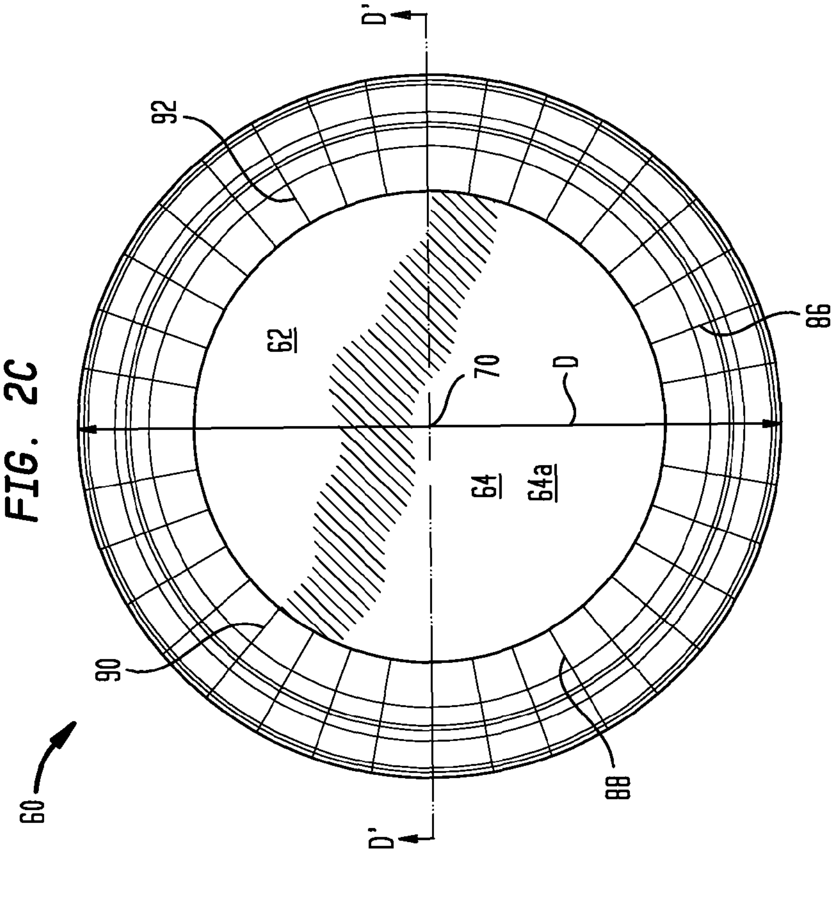
FIG. 2C is a plan view showing the plate of FIG. 2A and FIG. 2B.
Figure 2D:
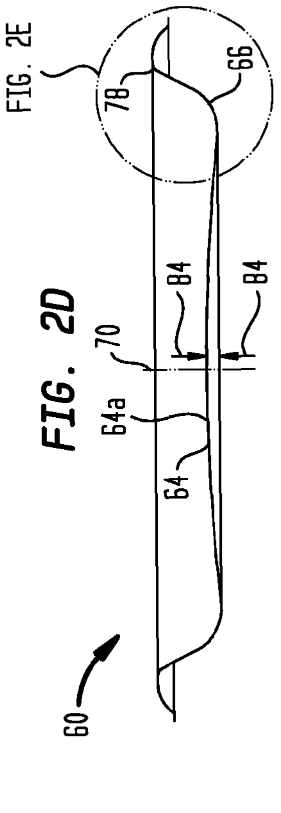
FIG. 2D is a view in section and elevation of the plate of FIGS. 2A-2C along line D', D' of FIG. 2C.
Figure 2F:
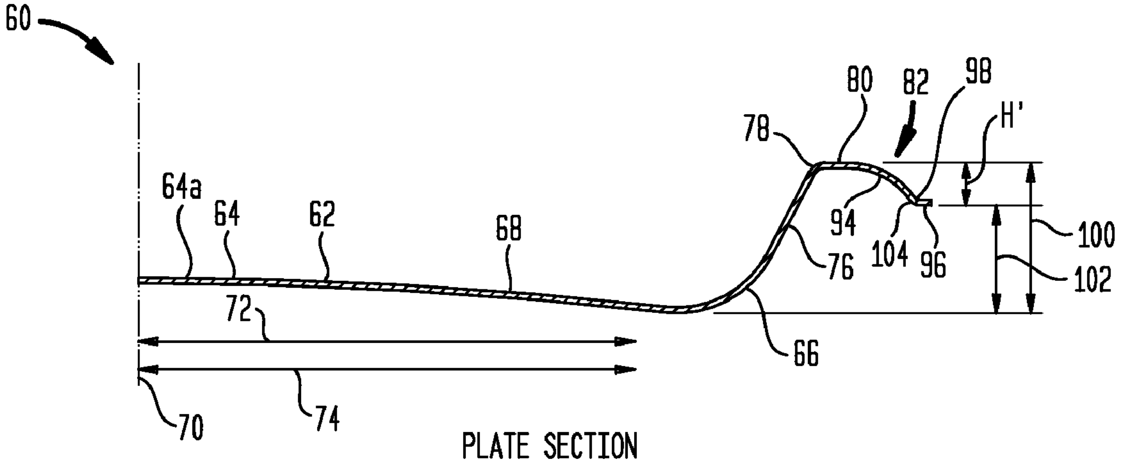
FIG. 2F is a diagram showing the profile from center of the plate of FIGS. 2A-2E.
Figure 2G:
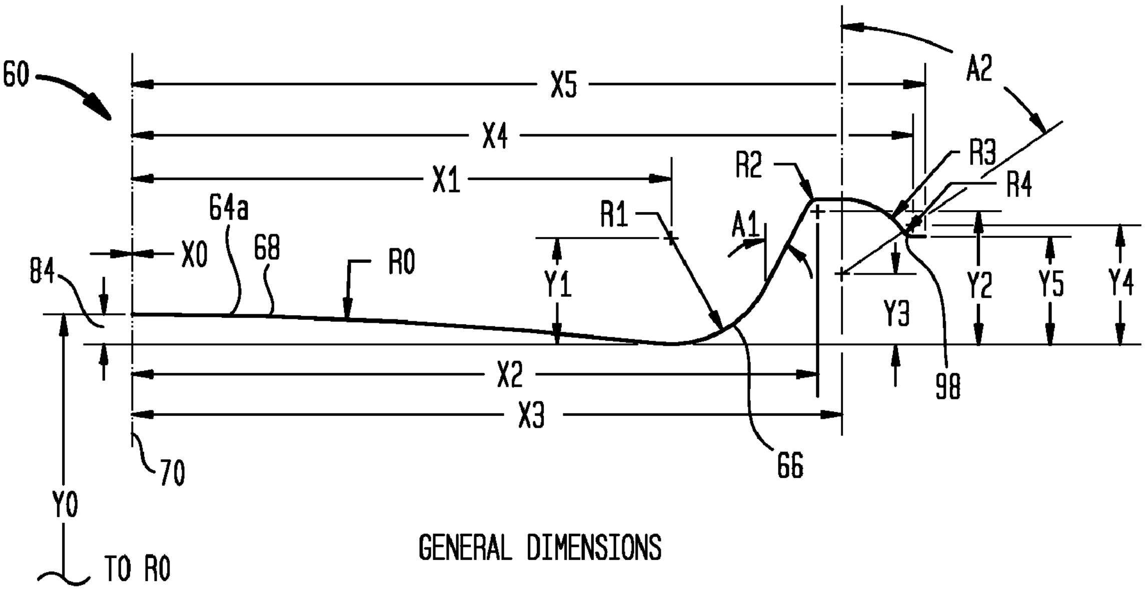
FIG. 2G is a schematic diagram illustrating the nomenclature for various dimensions of the plate of FIGS. 2A-2F.
Figure 2H:
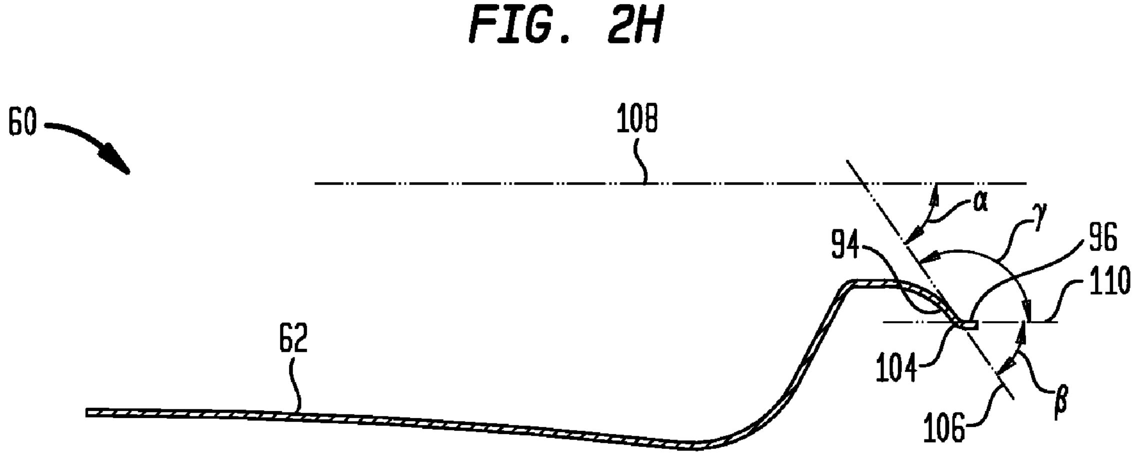
FIG. 2H is another schematic diagram illustrating various features of the plate of FIGS. 2A-2G.

The various structural features of the plate are particularly apparent in FIGS. 2F, 2G and 2H which are diagrams illustrating a profile from center of plate 60 having Profile 1. Bottom panel 62 has an arched central crown 64 with a convex upper surface 64*a* which extends from the center of the plate indicated at 70 to first annular transition portion 66. That is, the arched crown extends across the center all the way and directly adjoins first annular transition portion 66. At first annular transition portion 66, the plate flares upwardly and outwardly to sidewall portion 76 at a radius of curvature R1. Sidewall portion 76 makes an angle A1 with a vertical. At the upper portion of sidewall 76, the plate flares outwardly at second annular transition portion 78 defining a second radius of curvature R2. An outward brim section 94 flares outwardly and downwardly defining a radius of curvature R3 over angle A2 as shown in the diagram. At the outer edge of brim portion 94, the plate turns outwardly defining a radius of curvature R4. An outward evert 96 provides strength and rigidity to the container as described in United States Patent Publication No. US 2006/0208054 to Littlejohn et al. noted above.

The various dimensions in FIGS. 2F and 2G appear in Table 1, wherein: Y indicates generally a height from the lowermost portion of the bottom of the container (with the exception of Y0 which is the height of the crown from the origin of R0). Y1 is the height above the bottom of the container of the origin of radius of curvature R1 of first transition portion 66; Y2 is the height above the bottom of the container of radius of curvature R2; Y3 is the height above the bottom of the container of the origin of radius of curvature R3 of the outer portion 94 of brim 82; Y4 is the height above the bottom of the container of the origin of radius R4 of an outward transition portion 98; and Y5 is the height above the bottom of the container of evert portion 96. Similarly, X1 indicates the distance from center (X0) of the origin of radius of curvature R1. Likewise, X2 and X3 indicate respectively, the distance from the center of the plate (X0) of the origins of radii of curvature R2 and R3. Likewise, X4 indicates the distance from center of the origin radius of curvature, R4. X5 indicates the radius of the plate; that is ½ D.

Y0 is indicated schematically in the diagrams as the distance from the bottom of container center 70 to the origin of a radius of curvature R0 of convex upper surface 64*a* of arched central crown 64 of bottom panel 62. This aspect is a salient feature of the invention which is seen in the various examples and Tables and especially appreciated from the rigidity data, discussed below.

The height of the brim, "brim height", "brim vertical drop" and like terminology refers to the difference H' between the overall height of the container 100, FIG. 2F and height 102 of the periphery.

FIG. 2H illustrates the various angles α, β and γ of the embodiment of the Profile 1. Angle α is the angle between a tangent 106 at the terminus 104 of downwardly sloping brim portion 94 and a horizontal line 108. The eversion angle β is the angle between a tangent 110 to evert 96 adjacent its junction with transition 98 and tangent line 106 which is tangent to the terminus of portion 94 as shown. β is thus an outward change in downward slope of the outer portion of the article and may be measured directly or may alternatively be calculated as 180°−γ where the angle, γ, is the angle between tangent line 106 to portion 104 and tangent line 110 to evert portion 96. Angle β may be anywhere from 25° to 160° on an absolute basis. Portion 96 may have an upward slope, a downward slope or have 0 slope as is the case with Profile 1 where evert 96 is horizontal. It is not necessary that the length of the evert be uniform around the plate, nor is it required that the evert have a linear profile or a profile that is a combination of linear segments. The profile may be arcuate, for example, or comprise a combination of arcuate and linear segments as part of a generally bowed shape.

Generally, the eversion angle β is from about 30° to about 160°, more typically, from about 30° to about 120° or more preferably from about 30° to about 90° with from about 35° to about 65° or about 45° to about 55° in some particularly preferred cases. The evert portion preferably extends outwardly from the annular flange transition portion a length of at least about 0.005 D, while typically the evert portion extends outwardly from the annular flange transition portion a length of at least about 0.007 D. In many embodiments, the evert portion extends outwardly from the annular flange transition portion a length of from about 0.005 D to about 0.06 D, with a length of from about 0.007 D to about 0.03 D being a preferred range; for example, the evert portion may extend outwardly from the annular flange transition portion a length over its profile of from about 0.01 D to about 0.025 D. The evert portion may also extend upwardly, downwardly, or substantially horizontally from the brim transition portion and may have a linear profile or a curved profile and extend upwardly over a portion of its profile and downwardly over a portion of its profile. The length of the evert is measured along its profile, that is from the brim transition to the end of the evert. The height of any upward extension of the evert portion above the brim transition portion is preferably less than about 50 percent of the brim height, and is less than about 25 percent in most cases.

Still referring to FIGS. 2G and 2H, the downwardly sloping brim of the container makes a declivity angle α at its terminus with respect to a horizontal substantially parallel to the bottom portion which is generally less than about 80° or so. Less than about 75° is somewhat typical, with less than about 70° or 65° preferred in most cases. Likewise, the declivity angle α is typically at least about 25° or so, with a declivity angle α of at least 30°, 40°, 50° or between about 50° and about 60° being suitable in many embodiments. Between the downwardly sloping brim portion and the evert, the transition portion typically has a fairly small radius of curvature R4. Generally, the radius of curvature of the transition is less than ½", typically less than about ¼" and preferably about 1/16" or so for plates having a diameter of 8-10" or so. In most cases, a radius of curvature of the brim transition portion will be less than about ⅛", such as 1/16" or less. Radius of curvature R4 of the brim transition section will perhaps most preferably be between about ⅛" and 1/32". Without intending to be bound by theory, it is believed that a relatively small radius at R4 is beneficial in strengthening the rim of a pleated container to "lock" the pleated structure in place as is noted above in connection with R2. The ratio of the flange outer vertical drop or brim height, H', to the characteristic diameter, D, is generally greater than about 0.01. Further details as to the geometry of the class shown in Profile 1 (exclusive of bottom panel configuration and R2 curvature) are provided generally in United States Patent Publication No.: US 2006/0208054 to Littlejohn et al. (U.S. patent application Ser. No. 10/963,686), the disclosure of which is incorporated herein by reference specifically with respect to such features.

TABLE 1

Die Side Profile Dimensions
(Refer to FIGS. 2A and following for appropriate shape)

| Shape/ Size | Profile 1, 10" (0.188 Crown) | Profile 1, 9" (0.159 Crown) |
|---|---|---|
| R0 | 31.0822 | 25.4837 |
| X0 | 0.0000 | 0.0000 |
| Y0 | −30.8942 | −25.3248 |
| R1 | 0.5917 | 0.5650 |
| X1 | 3.4459 | 2.8726 |
| Y1 | 0.5917 | 0.5650 |
| R2 | 0.0740 | 0.0625 |
| X2 | 4.3252 | 3.6551 |
| Y2 | 0.8393 | 0.7093 |
| R3 | 0.4674 | 0.3950 |
| X3 | 4.4774 | 3.7837 |
| Y3 | 0.4459 | 0.3768 |
| R4 | 0.0740 | 0.0625 |
| X4 | 4.9227 | 4.1600 |
| Y4 | 0.7538 | 0.6370 |
| X5 | 4.9900 | 4.2248 |
| Y5 | 0.6798 | 0.5745 |

Figure 3:
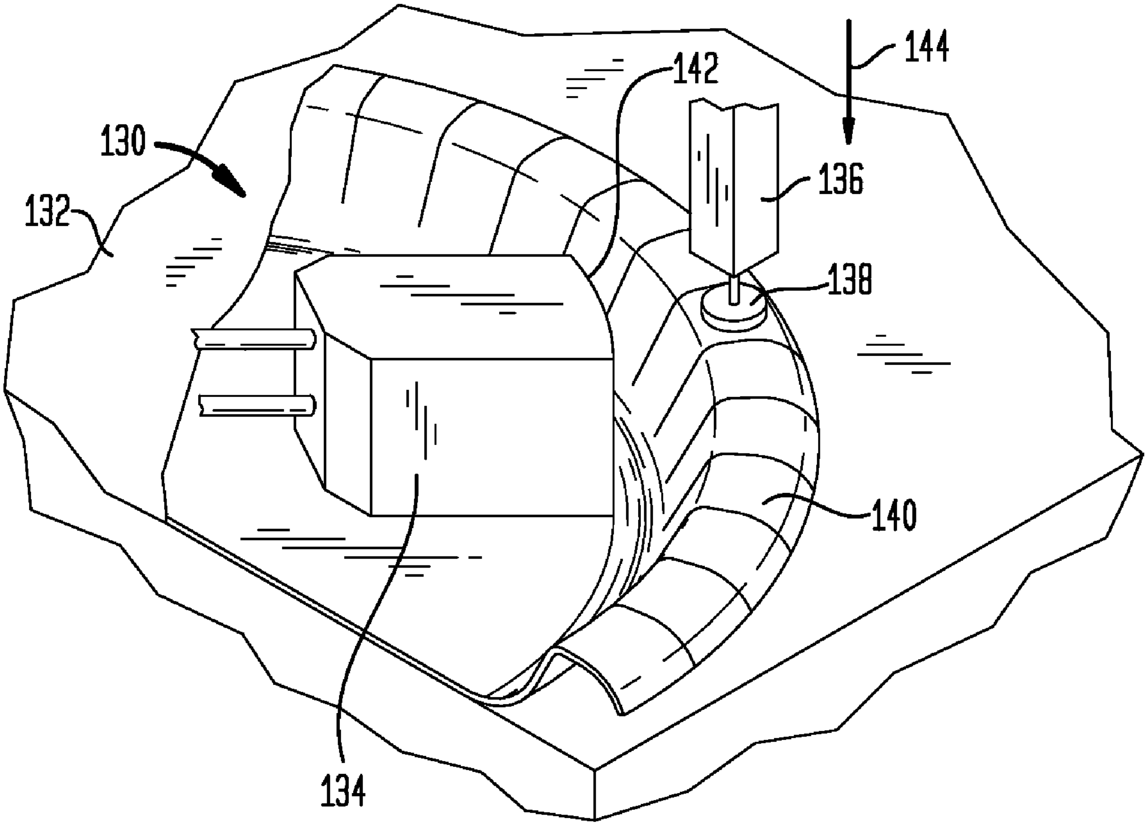
FIG. 3 is a schematic diagram illustrating a portion of an apparatus for determining Rim Stiffness.

Another suitable shape is disclosed in United States Patent Application Publication No. US 2006/0208054 of Littlejohn et al., in FIGS. 1-3, which we refer to herein as Profile 2.

Rigidity and Rim Stiffness

Plates of the invention were evaluated for SSI Rigidity and Rim Stiffness and compared with plates having a like design sized with conventional starch. Rigidity is expressed in grams/0.5" and is measured with the Single Service Institute Plate Rigidity Tester of the type originally available through Single Service Institute, 1025 Connecticut Ave., N.W., Washington, D.C. The SSI rigidity test apparatus has been manufactured and sold through Sherwood Tool, Inc., Kensington, Conn. This test is designed to measure the rigidity (i.e., resistance to buckling and bending) of paper and plastic plates, bowls, dishes, and trays by measuring the force required to deflect the rim of these products a distance of 0.5" while the product is supported at its geometric center. Specifically, the plate specimen is restrained by an adjustable bar on one side and is center supported. The rim or flange side opposite to the restrained side is subjected to 0.5" deflection by means of a motorized cam assembly equipped with a load cell, and the force (grams) is recorded. The test simulates in many respects the performance of a container as it is held in the hand of a consumer, supporting the weight of the container's contents. SSI rigidity is expressed as grams per 0.5" deflection. A higher SSI value is desirable since this indicates a more rigid product. All measurements were done at standard TAPPI conditions for paperboard testing, 72° F. and 50% relative humidity. Geometric mean averages (square root of the MD/CD product) values are reported herein.

For Wet Rigidity the specimen is conditioned as above, then filled with water at 160° F. for 30 minutes, drained and tested. For 10" plates, 130 ml of hot water is used.

The particular apparatus employed for SSI rigidity measurements was a Model No. ML-4431-2 SSI rigidity tester as modified by Georgia-Pacific Corporation, National Quality Assurance Lab, Lehigh Valley Plant, Easton, Pa. 18040 using a Chatillon gauge available from Chatillon, Force Measurements Division, P.O. Box 35668, Greensboro, N.C. 27425-5668.

Rim Stiffness is a measure of the local rim strength about the periphery of the container as opposed to overall or SSI rigidity. This test has been noted to correlate well with actual consumers' perception of product sturdiness. SSI rigidity is one measure of the load carrying capability of the plate, whereas Rim Stiffness often relates to what a consumer feels when flexing a plate to gauge its strength. (Plates with higher Rim Stiffness have also demonstrated greatly improved weight carrying capabilities under simulated use testing, described hereinafter.) Preferably, specimens are conditioned and testing performed at standard conditions for paperboard testing when a paper container is tested, 72° F. and 50% relative humidity.

The particular apparatus employed is referred to as a Rim Stiffness instrument, developed by Georgia-Pacific, Neenah Technical Center, 1915 Marathon Avenue, Neenah, Wis. 54956. This instrument includes a micrometer which reads to 0.001" available from Standard Gage Co., Inc., 70 Parker Avenue, Poughkeepsie, N.Y. 12601, as well as a load gauge available from Chatillon, Force Measurements Division, P.O. Box 35668, Greensboro, N.C. 27425-5688. The test procedure measures the force to deflect the rim downwardly 0.1" as the specimen is restrained about its bottom between a platen and a restraining member as will be further appreciated by reference to FIG. 3.

Rim Stiffness instrument 130 includes generally a platen 132, a plurality of restraining members, preferably four equally spaced restraining members such as member 134 and a gauge 136 provided with a probe 138. A specimen such as plate 140 is positioned as shown and clamped tightly about its planar bottom portion to platen 132 by way of restraining members, such as member 134. The specimen is clamped over an area of several square inches or so such that the bottom of the specimen is fully restrained inwardly from the first transition portion. Note that restraining member 134 is disposed such that its outer edge 142 is positioned at the periphery of the serving area of the container, that is, at the start of the first transition at the bottom of the container.

Probe 138 is then advanced downwardly in the direction of arrow 144 a distance of 0.1" while the force is measured and recorded by gauge 136. Only the maximum force is recorded, typically occurring at the maximum deflection of 0.1". Probe 138 is preferably positioned in the center of the flange of plate 140 or on a high point of the flange as appropriate. The end of the probe may be disk-shaped or of other suitable shape and is preferably mounted on a universal-type joint so that contact with the rim is maintained during testing. Probe 138 is generally radially aligned with restraining clamp member 134.

Load to Failure Testing

Plates of the present invention and various conventional plates were tested for their ability to support a simulated food load. Load to failure testing involved securing the plate at one side while supporting its bottom panel at center (1 hand test) and loading the plate with weights to simulate a food load until failure occurred. The load causing failure is reported as the maximum load; "failure" being determined as the point at which the plate buckled or otherwise could not support the load. The test is better understood with reference to FIGS. 4A and 4B.

Figure 4A:
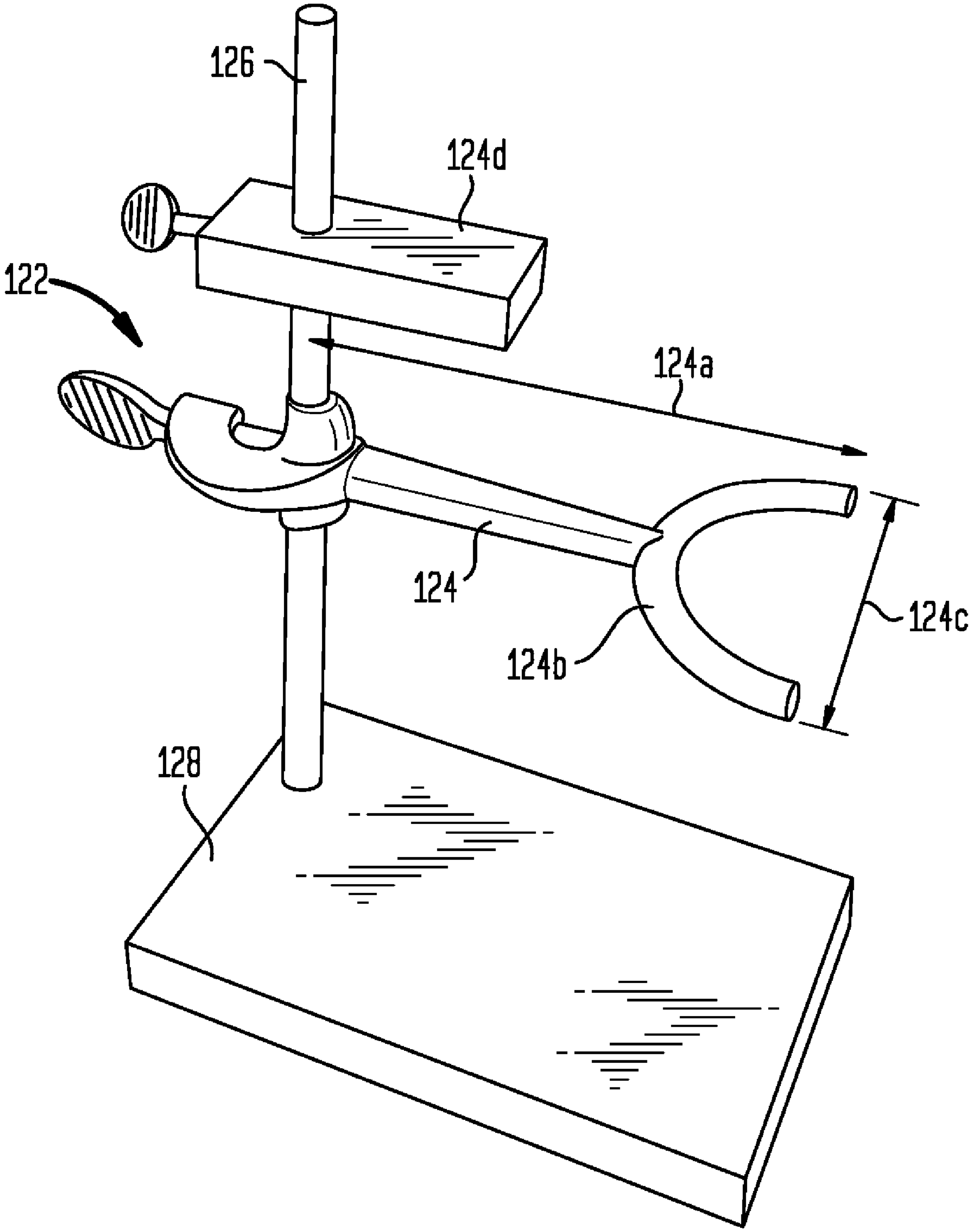
FIG. 4A is a schematic diagram illustrating an apparatus used for measuring load-bearing capability of disposable plates.

The apparatus 122 used to measure load to failure includes a supporting arm 124 which is clamped to a post 126 which is mounted on a base 128 as shown in FIG. 4A. Supporting arm 124 extends outwardly a distance 124*a* from post 126 of about 4⅛". The arm further defines a supporting fork 124*b* which has a supporting span 124*c* across the fork of about 2⅝" (center to center). Further provided is a clamping member 124*d* used to secure a plate such as plate 60 in apparatus 122.

Figure 4B:
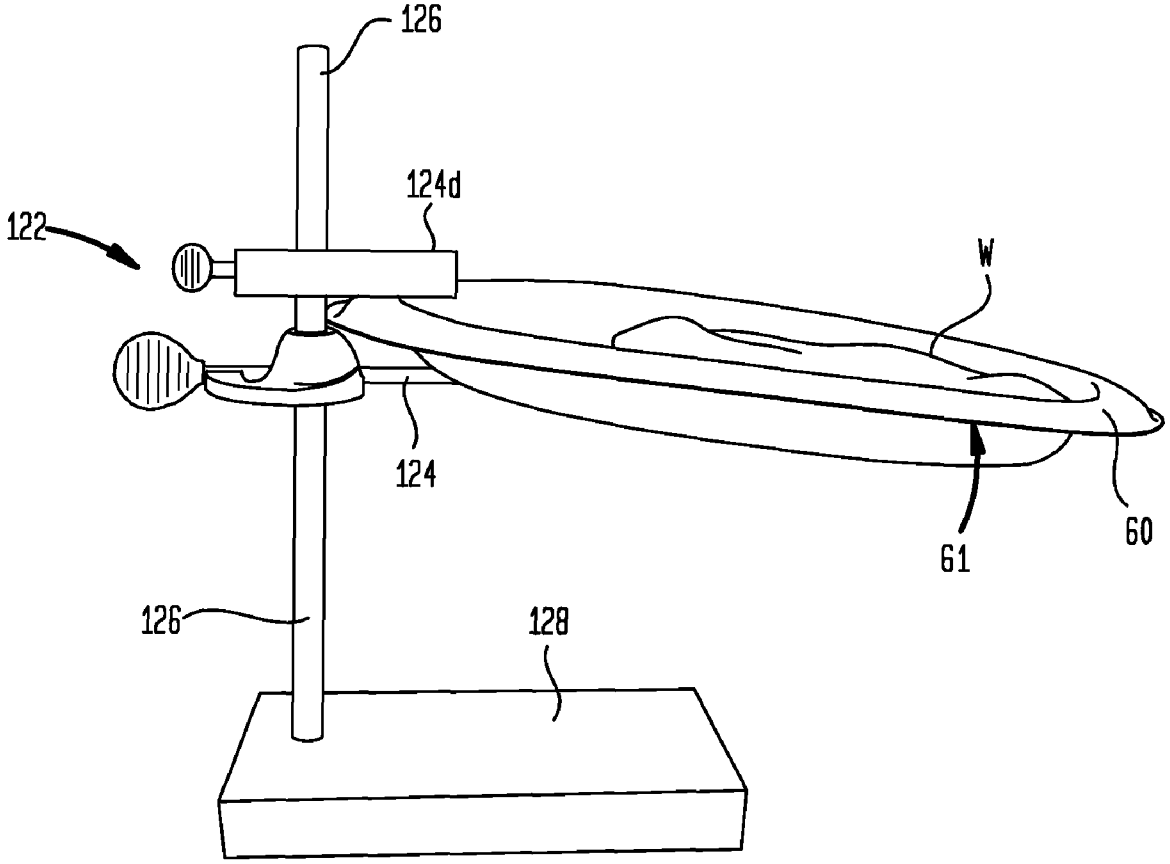
FIG. 4B is a schematic diagram illustrating testing of load-bearing capability of a plate utilizing the apparatus of FIG. 4A.

In FIG. 4B a plate 60 is shown mounted in apparatus 122 wherein fork 124*b* supports plate 60 in its central area and the plate abuts post 126. To determine load-bearing capability, weights such as weight W are used to simulate a food load on an outer portion 61 of plate 60. Weights are added in small increments (¼ lb) until the plate fails. The load just before the load causing failure (lbs) is recorded as the one hand hold maximum dry weight for this test.

While this test is somewhat more qualitative than those noted above for Rigidity and Rim Stiffness, results again show that the plates of the invention have as much and more dry strength than like plates made with starch, the conventional material of choice for use in pressware sizing.

Figure 5:
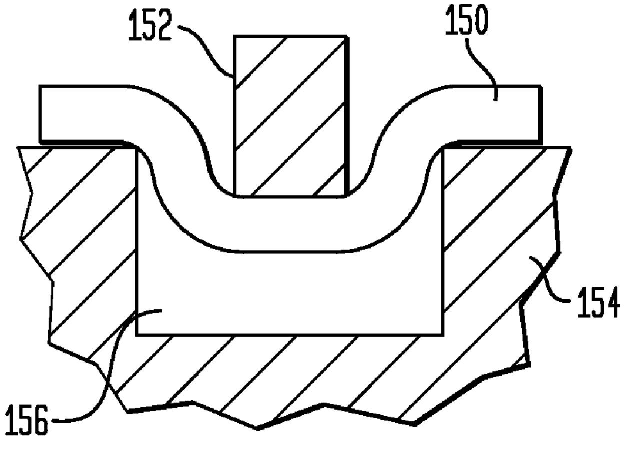
FIGS. 5 through 7 are schematic diagrams illustrating scoring and pleating paperboard.
Figure 6:
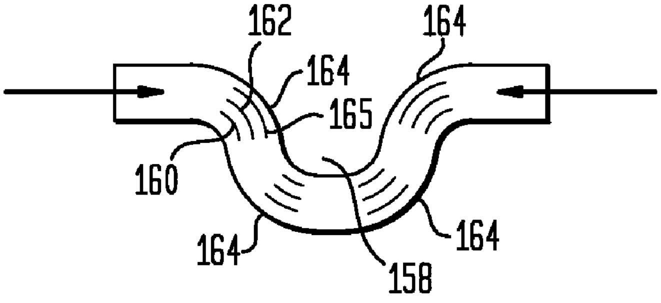
Figure 7:
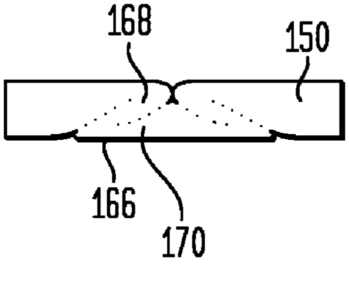

In preferred cases, the paperboard is scored prior to forming into a container to promote pleat formation. In FIG. 5 there is shown a portion of paperboard stock 150 positioned between a score rule 152 and a scoring counter 154 provided with a channel 156 as would be the case in a scoring press or scoring portion of a pressware forming press. The geometry is such that when the press proceeds reciprocally downwardly and scores blank 150, U-shaped score 158 results, see FIG. 6. At least incipient delamination of the paperboard into lamellae indicated at 160, 162, 165 is believed to occur in the sharp corner regions indicated at 164. The same reciprocal scoring operation could be performed in a separate press operation to create blanks that are fed and formed subsequently. Alternatively, a rotary scoring and blanking operation may be utilized as is known in the art. When the product is formed in a heated matched die set, preferably a generally U-shaped pleat 166 (FIG. 7) with a plurality of rebonded paperboard lamellae 168, 170 along the pleat is formed such that pleats 166 (or 86, 88, 90 and so forth as shown in FIGS. 2A and following) have the configuration shown schematically. This shape may be referred to as an "omega" shape, a "horseshoe" shape or a "crushed horseshoe" shape. While the pleats will often have this structure, in other cases a Z or S shaped pleat may be formed, corresponding in essence to ½ of a U-shaped pleat.

During the forming process described hereinafter as a pleat is formed, internal delamination of the paperboard into a plurality of lamellae occurs, followed by rebonding of the lamellae under heat and pressure into a substantially integrated fibrous structure generally inseparable into its constituent lamellae. Preferably, the pleat has a thickness roughly equivalent to the circumferentially adjacent areas of the rim and most preferably is more dense than adjacent areas. Integrated structures of rebonded lamellae are indicated schematically at 168, 170 in FIG. 7 on either side of paperboard fold lines in the pleat indicated in dashed lines.

The substantially rebonded portion or portions of the pleats 166 in the finished product preferably extend generally over the entire length (75% or more) of the score which was present in the blank from which the product was made. The rebonded portion of the pleats may extend only over portions of the pleats in an annular region of the periphery of the article in order to impart strength. Such an annular region or regions may extend, for example, around the container extending approximately from the transition of the bottom of the container to the sidewall outwardly to the outer edge of the container, that is, generally along the entire length of the pleats shown in the Figures above. The rebonded structures may extend over an annular region which is less than the entire profile from the bottom of the container to its outer edge. For example, an annular region of rebonded structures oriented in a radial direction may extend around the container from inner transition 66 to the outermost edge of evert 96. Alternatively, an annular region or regions of such rebonded structures may extend over all or only a portion of the length of sidewall 76; over all or part of second annular transition portion 78; over all or part of outer flange portion 80; or combinations thereof. It is preferable that the substantially integrated rebonded fibrous structures formed extend over at least a portion of the length of the pleat, more preferably over at least 50% of the length of the pleat and most preferably over at least 75% of the length of the pleat. Substantially equivalent rebonding can also occur when pleats are formed from unscored paperboard.

At least one of the optional sidewall portion, the second annular transition portion, and the outer flange portion is provided with a plurality of circumferentially spaced, radially extending regions formed from a plurality of paperboard lamellae rebonded into substantially integrated fibrous structures generally inseparable into their constituent lamellae. The rebonded structures extend around an annular region corresponding to a part of the profile of the optional sidewall, second annular transition portion or the outer flange portion of the container. More preferably, the integrated structures extend over at least part of all of the aforesaid profile regions about the periphery of the container. Still more preferably, the integrated rebonded structures extend generally over the length of the pleats, over at least 75% of their length, for instance; however, so long as a majority of the pleats, more than about 50% for example, include the rebonded structures described herein over at least a portion of their length, a substantial benefit is realized. In some preferred embodiments, the rebonded structures define an annular rebonded array of integrated rebonded structures along the same part of the profile of the container around an annular region of the container. For example, the rebonded structures could extend along the optional sidewall portion of all of the pleats shown in FIGS. 2A and following along a length to define an annular array around the optional sidewall portion of the container.

Figure 8:
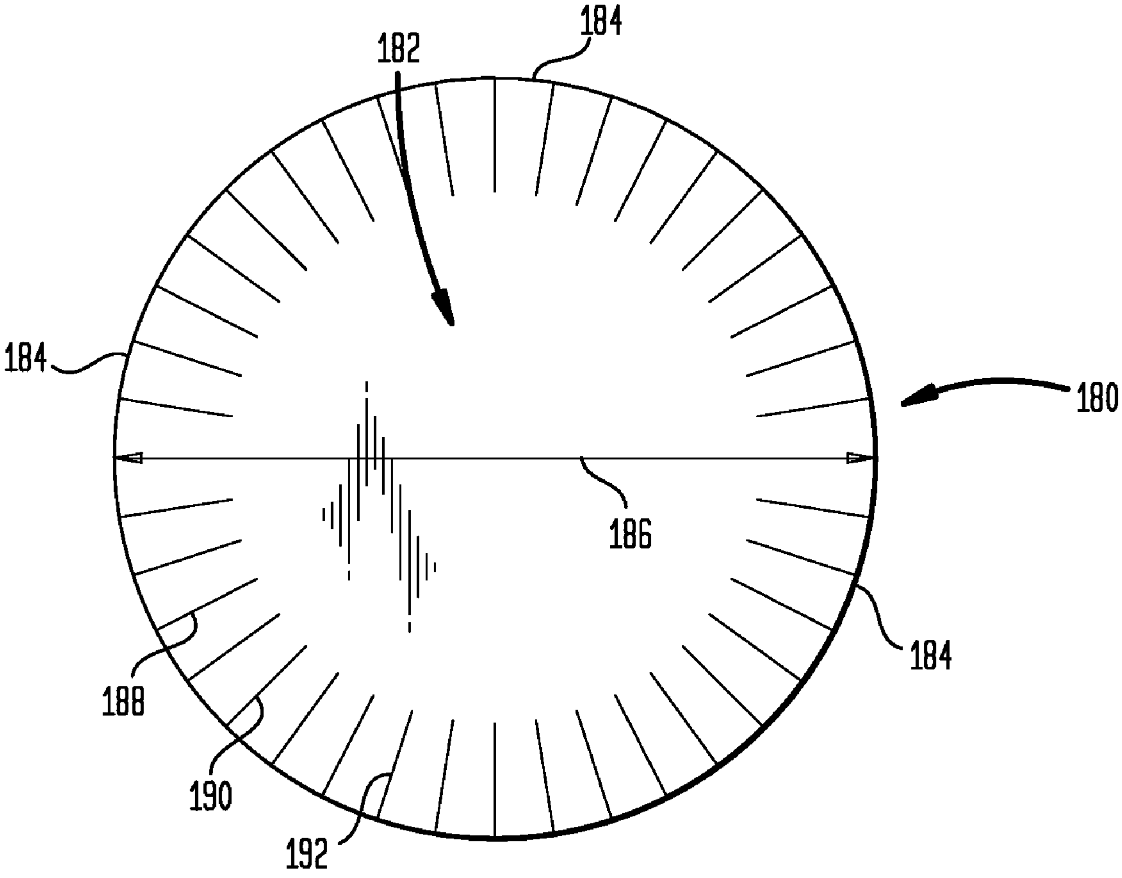
FIG. 8 is a schematic diagram of a paperboard blank which is scored with 40 scores of uniform spacing.

A suitable paperboard blank to make the inventive containers is shown in plan view in FIG. 8. In FIG. 8 a paperboard blank 180 impregnated with nano starch is generally planar and includes a central portion 182 defining generally thereabout a perimeter 184 having a diameter 186. There is provided about the perimeter 184 of blank 180 a plurality of scores such as scores 188, 190 and 192. The scores are preferably evenly spaced and facilitate formation of evenly spaced pleats.

The following co-pending patents and patent applications contain further information as to materials, processing techniques and equipment and are also incorporated by reference: U.S. Pat. No. 7,337,943, entitled "Disposable Servingware Containers with Flange Tabs"; U.S. Pat. No. 7,048,176, entitled "Deep Dish Disposable Pressed Paperboard Container"; U.S. Pat. No. 6,893,693, entitled "High Gloss Disposable Pressware"; U.S. Pat. No. 6,733,852, entitled "Disposable Serving Plate With Sidewall-Engaged Sealing Cover"; U.S. Pat. No. 6,715,630, entitled "Disposable Food Container With A Linear Sidewall Profile and an Arcuate Outer Flange"; U.S. Pat. No. 6,474,497, entitled "Smooth Profiled Food Service Article"; U.S. Pat. No. 6,592,357, entitled "Rotating Inertial Pin Blank Stops for Pressware Die Set"; U.S Pat. No. 6,589,043, entitled "Punch Stripper Ring Knock-Out for Pressware Die Sets"; U.S. Pat. No. 6,585,506, entitled "Side Mounted Temperature Probe for Pressware Die Set": and U.S. Application Ser. No. 11/465,694 (Publication No. US 2007/0042072), entitled "Pressware Forming Apparatus, Components Therefore and Methods of Making Pressware Therefrom", See also, U.S. Pat. Nos. 5,249,946; 4,832,676; 4,721,500; and 4,609,140, which are particularly pertinent. If it is desired to reduce migration of wax to the surface, especially in pleated areas, the forming pressure may be halved if so desired and optionally, the temperature reduced slightly.

The paperboard stock is moistened on the uncoated side after sizing and all of the printing and coating steps have been completed. In a typical forming operation, the web of paperboard stock is fed continuously from a roll through a scoring and cutting die to form the blanks which are scored and cut before being fed into position between the upper and lower die halves. The die halves are heated as described above, to aid in the forming process. It has been found that best results are obtained if the upper die half and lower die half—particularly the surfaces thereof—are maintained at a temperature in the range of from about 250° F. to about 400° F., and most preferably at about 325° F.±25° F. These die temperatures have been found to facilitate rebonding and the plastic deformation of paperboard in the rim areas if the paperboard has the preferred moisture levels. At these preferred die temperatures, the amount of heat applied to the blank is sufficient to liberate the moisture within the blank and thereby facilitate the deformation of the fibers without overheating the blank and causing blisters from liberation of steam or scorching the blank material. It is apparent that the amount of heat applied to the paperboard will vary with the amount of time that the dies dwell in a position pressing the paperboard together. The preferred die temperatures are based on the usual dwell times encountered for normal plate production speeds of 40 to 60 pressings a minute, and commensurately higher or lower temperatures in the dies would generally be required for higher or lower production speeds, respectively.

Without intending to be bound by theory, it is believed that increased moisture, temperature, and pressure in the region of the pleat during pleat formation facilitates rebonding of lamellae in the pleats; accordingly, if insufficient rebonding is experienced, it can generally be addressed by increasing one or more of temperature, pressure or moisture.

A die set wherein the upper assembly includes a segmented punch member and is also provided with a contoured upper pressure ring is advantageously employed in carrying out the present invention. Pleating control is preferably achieved in some embodiments by lightly clamping the paperboard blank about a substantial portion of its outer portion as the blank is pulled into the die set and the pleats are formed. For some shapes the sequence may differ somewhat as will be appreciated by one of skill in the art. Paperboard containers configured in accordance with the present invention are perhaps most preferably formed from scored paperboard blanks.

Referring to FIGS. 9 through 13 there is shown schematically from center a segmented die set 200 for making plates having the shape of Profile 1. Die set 200 includes a punch base 202, a punch knock-out 204 and a pressure ring 206. Pressure ring 206 is typically spring-biased as is well known in the art. The die set also includes a die base 208, as well as a die knock-out 210 and a draw ring 212. Draw ring 212 is likewise spring biased. The punch knock-out is sometimes an articulated style (as shown here) having 0.030" to 0.120" articulation stroke during the operation. The pressure ring may have the outer product profile machined into it and provides further pleating control by clamping the blank between its profile area and die outer profile during the formation as will be appreciated by one of skill in the art. Preferably, the die base 208 defines a continuous forming contour 214 as shown, while the punch forming contour may be a split contour having portions 216*a*, 216*b* as shown.

Figure 10:
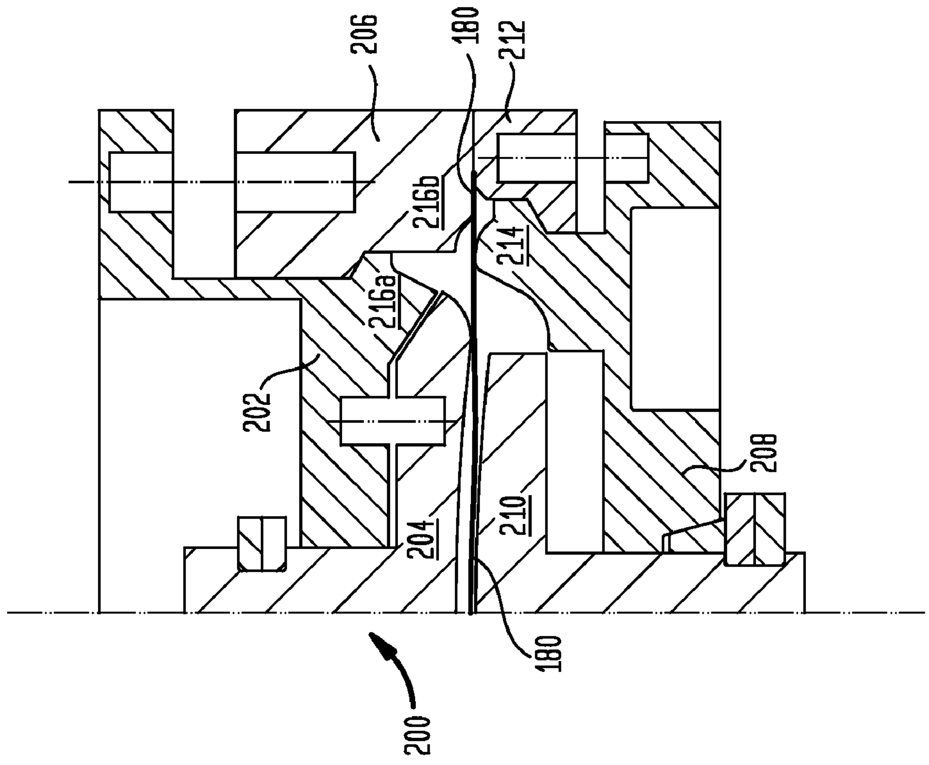
FIGS. 9, 10, 11, 12 and 13 are diagrams illustrating a pressware die set useful for forming containers having the Profile 1 shape and its operation.
Figure 9:
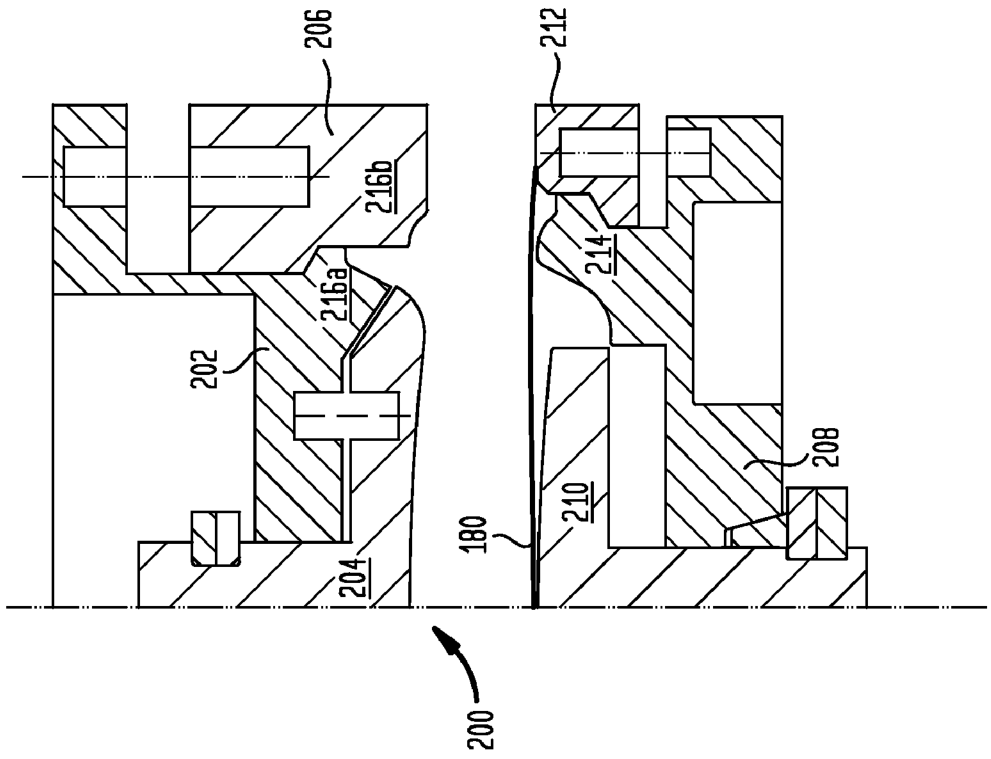

FIGS. 9-13 illustrate the sequential operation of the forming die as the product 60 of FIG. 2A is formed. In FIG. 9, the die set is fully open and receives a planar paperboard blank such as blank 180. In FIG. 10 the punch is seen to have advanced toward the die such that pressure ring 206 and draw ring 212 have advanced toward the blank and will contact the blank at its outermost portions. The punch pressure ring contacts the blank, clamping it against the lower draw ring and an optional relief area (not shown) to provide initial pleating control. The draw ring and pressure ring springs typically are chosen in a manner to allow full movement of the draw ring prior to pressure ring movement (i.e., full spring force of draw ring is less than or equal to the pre-load of the pressure ring springs). It is noted with respect to FIG. 10 that the forming contours of the bases have advanced toward blank 180, but have not yet closed thereupon.

Figure 11:
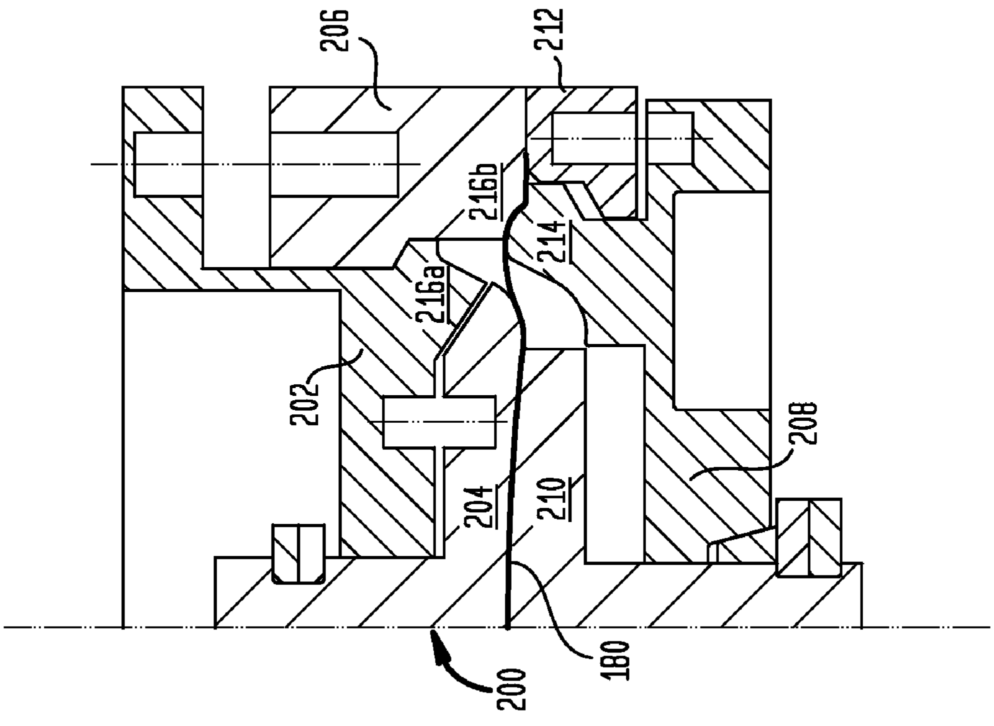

In FIG. 11, the die set continues to close, with punch base 202 continuing to advance towards die base 208, wherein the knock-outs 204, 210, forming contour 214, and forming contour portion 216*b* are contacting the blank. The punch and die knock-outs (which may have compartment ribs machined into them) hold the blank on center as it is formed.

Figure 12:
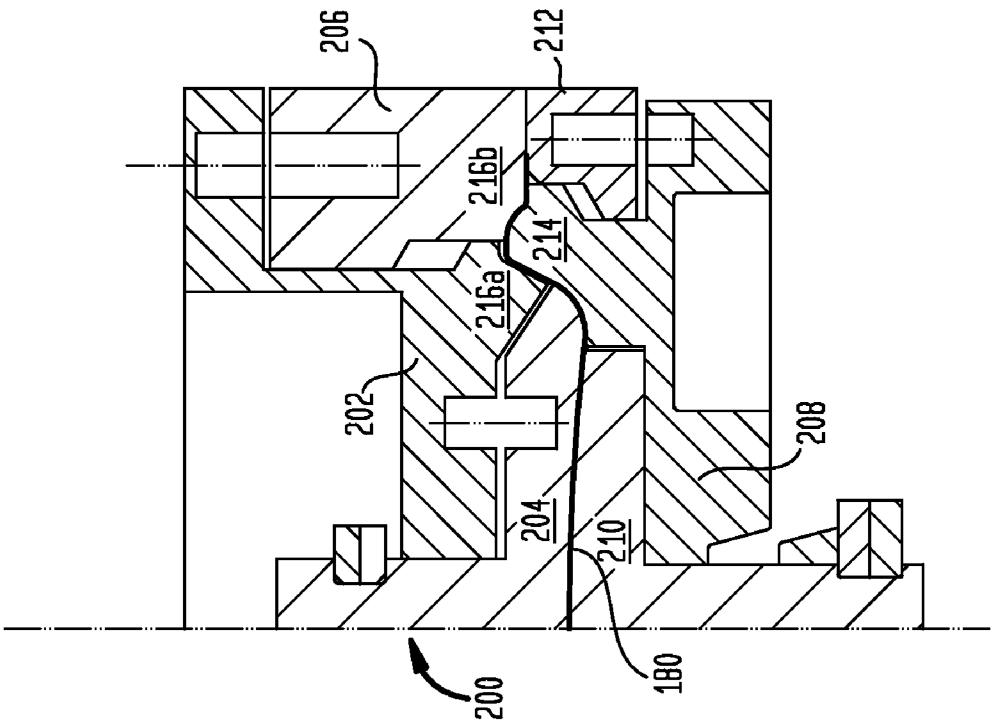
Figure 13:
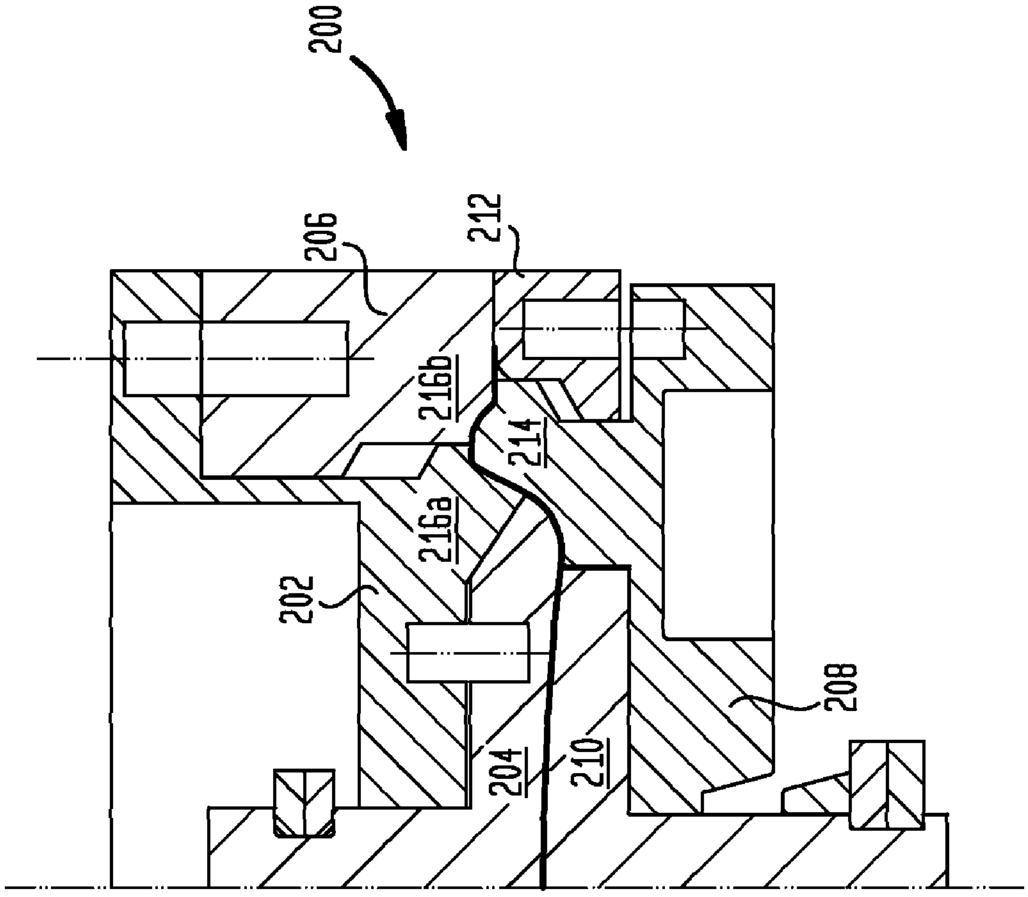

In FIG. 12, a still more advanced stage, the die set is forming the container. In FIG. 13, the die set is fully closed and the contour portion of the punch base applies pressure to the flange area.

The die opens by reversed staging and a fully formed product is removed from the die set. Utilizing the procedures noted above a series of plates were prepared having the shape of Profile 1 described in detail above, as well as Profile 2. These plates were formed with conventional board being 9-12 lbs of starch sizing and with wax impregnated board as described earlier, having 9-12 lbs of wax and no starch or other sizing. Results appear in Table 2 below.

TABLE 2

Commercial Trial Plate Properties (EFN 070708)

| Example | Description | Basis Weight (lbs/ream) | Caliper (mils) | Dry Rigidity (grams/.5") | Rim Stiffness (grams/.1") | 1 Hand Hold Maximum - Dry Weight (lbs) | Wet Rigidity Water (grams/.5") |
|---|---|---|---|---|---|---|---|
| A | 220# - Profile 1 Control | 233 | 20.4 | 544 | 2155 | 3.92 | 188 |
| B | 220# - Profile 2 Control | 232 | 20.5 | 363 | 1976 | 3.13 | 173 |
| 1 | 220# Paraffin Wax - Profile 1 | 236 | 20.5 | 555 | 2147 | 4.00 | 514 |
| 2 | 220# Paraffin Wax - Profile 2 | 235 | 20.5 | 380 | 1913 | 3.33 | 311 |
| 3 | 220# Soy Wax - Profile 1 | 236 | 20.6 | 393 | 1570 | 3.13 | 368 |
| 4 | 220# Soy Wax - Profile 2 | 237 | 20.6 | 305 | 1554 | 2.62 | 292 |

It will be appreciated from Table 2 that the wax-infused containers made without starch having the Profile 1 and Profile 2 shapes had comparable dry strength, and much improved wet strength. The average Wet Rigidity loss of the wax treated plates was only approximately 10% in comparison to an average loss of Rigidity of over 50% for the starch-sized plates.

The containers of the invention may also be made by way of a punch-through apparatus as is described in copending U.S. patent application Ser. No. 11/778,232 (Publication No. US 2008/0015098), entitled "Disposable Fluted Paperboard Plates and Method of Making Same" filed Jul. 16, 2007, the disclosure of which is incorporated herein by reference. A wax-infused paperboard with an undersaturated wax layer adjacent the serving surface is cold-formed or hot formed as described in the '232 application. These containers have a basis weight of from at least 75 pounds per ream to 160 pounds per ream or more. That is, the paperboard can have basis weights prior to wax addition of least 75, 85, 95, 100, 110, 120, 130, 140, 150 or 160 pounds per ream, where any value can form an upper or lower endpoint of a range, as appropriate. Generally, a basis weight of the board of from 75-200 lbs/ream may be used.

Figure 14:
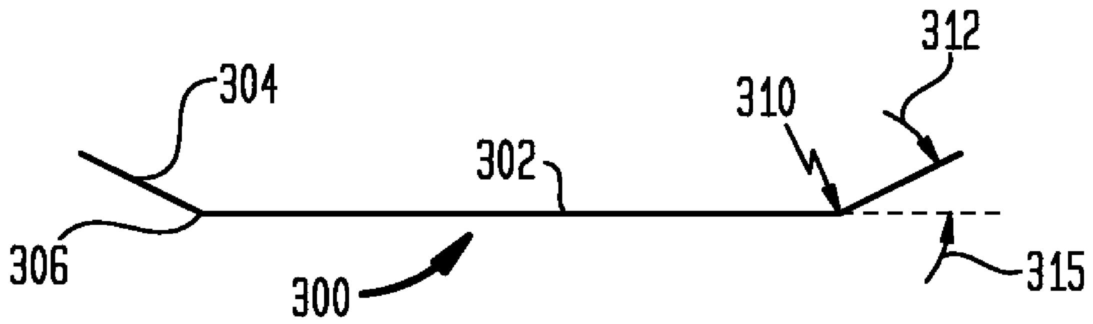
FIG. 14 is a schematic diagram illustrating a product geometry for a punch-through product.
Figure 15:
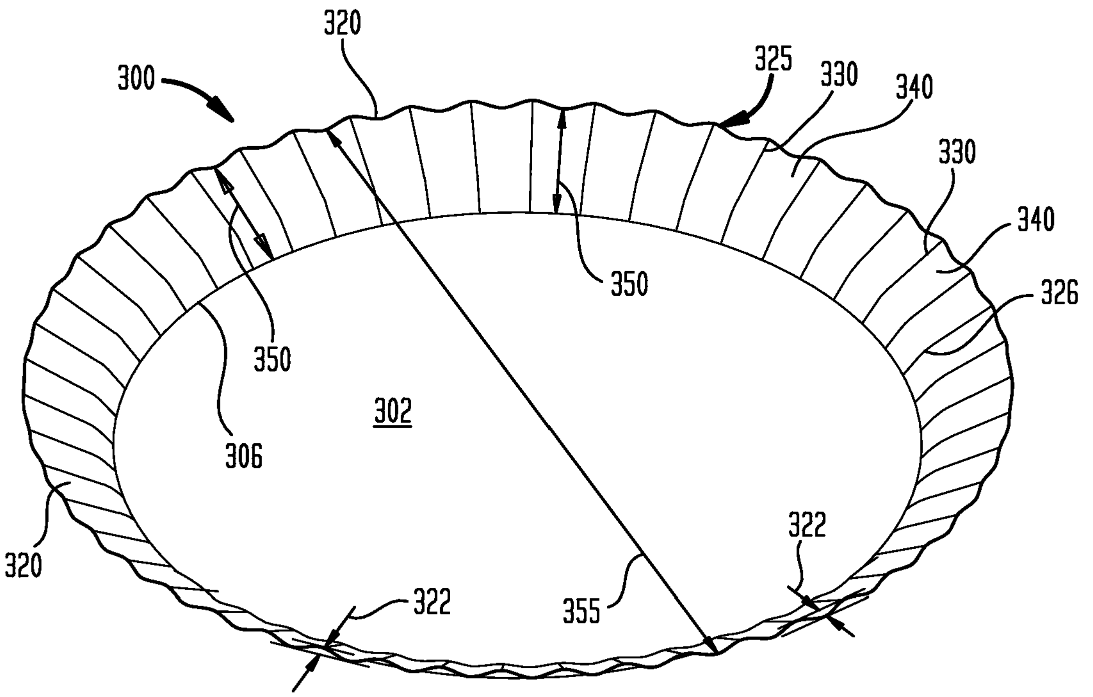
FIG. 15 is a view in perspective of a punch-through formed fluted plate of the invention.
Figure 16:
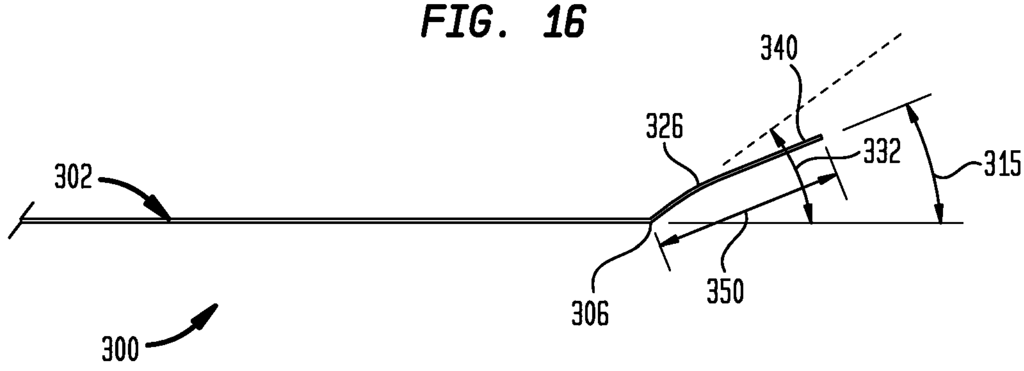
FIG. 16 is a schematic diagram illustrating radial profile of the fluted plate of FIG. 15.

FIG. 14 shows generally the desired shape of a white no-print plate (WNP) 200 configured in accordance with the '232 application. WNP plate 300 includes generally a center portion 302 and a sidewall portion 304. Note that the plate has a single radial transition 206 that is generally of a very sharp radius indicated at 310, as well as a sidewall angle α indicated as the angle between horizontal surface 315 and raised line 312. The shape of the WNP plates of the invention is slightly more complex than indicated in FIG. 14. The WNP plates are still further appreciated by reference to FIG. 15 which shows a nominal 9" WNP plate 300 provided made of paperboard having a basis weight of from about 85 to about 115 lbs per ream provided with about 50 flutes 320 about its perimeter 325. Flutes 320 extend from transition 306 to a perimeter 325 of plate 300. Flutes 320 have a flute depth 322 at the perimeter of plate 300 of from about 0.1" to about 0.18" much less than a coffee filter, for example. It will be appreciated from FIGS. 15 and 16 that a radial profile along a crest 330 of a flute 320 will have a slightly higher sidewall angle 332 than a corresponding sidewall angle, which corresponds to the angle along a trough 340 of a flute 320. For purposes of characterizing the sidewall, angle measurement is taken along a trough; that is to say, the characteristic angle is measured as angle α which is the minimum sidewall angle over the circumferential span of a flute. Typically, in a nominal 9" plate, the flutes have a length 350 of about 1⅜" and a flute depth 322 of slightly less than ⅛" or less for a plate having a diameter 355 of 9" or so. It is seen in FIGS. 15 and 16, that sidewall 304 of plate 300 has a slight inflection 326 due to the processes of the present invention. This feature is not a transition from, to or through horizontal and is not a substantial sidewall feature involving a substantial change in profile direction; rather the inflection is a result of stress applied to the paperboard during formation and relaxation of the sidewall area thereafter.

While the invention has been described in connection with numerous examples, it will be appreciated by one of skill in the art that plates, bowls, oval platters and trays and so forth having various shapes and sizes may be made from paperboard infused with wax. Some may be square or rectangular with rounded corners, triangular, multi-sided, polygonal and similar shape having the profile as described. The products may be compartmented. So also, instead of using a single paperboard layer blank, a composite paperboard blank may be used. For example, a container 60 of the invention may be formed from a composite paperboard material wherein the containers are formed by laminating three separate paperboard layers to one another in the form of the container having the shape shown in FIG. 2A. The particular manipulative steps of forming a composite plate are discussed in greater detail in U.S. Pat. Nos. 6,039,682, 6,186,394 and 6,287,247, the disclosures of which are incorporated herein by reference. Containers of the invention thus provide for increases in Rigidity, Rim Stiffness, as well as an improved ability to support a load. Modifications to the specific embodiments described above, within the spirit and scope of the present invention as is set forth in the appended claims, will be readily apparent to those of skill in the art.

What is claimed is:

1. A disposable servingware container press-formed from paperboard comprising:

(a) a bottom panel;

(b) an annular transition portion around the periphery of the bottom panel;

(c) an outer portion extending upwardly and outwardly with respect to the annular transition portion, the container having an outer surface and an inner surface distal to the outer surface, the inner surface being adapted as a serving surface;

(d) wherein the paperboard is infused with wax on one side thereof prior to press-forming said container in an amount of from 0.015 lb wax/lb-ream of paperboard to 0.15 lb wax/lb-ream of paperboard such that the paperboard has a wax-infused layer enriched with wax proximate one side thereof and a layer undersaturated with wax proximate the other side thereof, and (e) wherein further the wax-infused layer enriched with wax is proximate the outer surface of the container and the layer undersaturated with wax is proximate the inner surface of the container.

2. The disposable servingware container according to claim 1, wherein the paperboard is infused with wax on one side thereof with from 0.025 lb wax/lb-ream of paperboard to 0.1 lb wax/lb-ream of paperboard.

3. The disposable servingware container according to claim 1, wherein the paperboard is infused with wax on one side thereof with from 0.04 lb wax/lb-ream of paperboard to 0.075 lb wax/lb-ream of paperboard.

4. The disposable servingware container according to claim 1, wherein the container has a plurality of pleats formed in its outer portion.

5. The disposable servingware container according to claim 1, wherein the paperboard has a basis weight of from 80 lbs/3000 $ft^2$ ream to 400 lbs/3000 $ft^2$ ream.

6. The disposable servingware container according to claim 5, wherein the paperboard has a basis weight of from 90 lbs/3000 $ft^2$ ream to 300 lbs/3000 $ft^2$ ream.

7. The disposable servingware container according to claim 1, wherein the container has a plurality of flutes formed in its outer portion.

8. The disposable servingware container according to claim 7, wherein the paperboard has a basis weight of from 75 lbs/3000 $ft^2$ ream to 160 lbs/3000 $ft^2$ ream.

9. The disposable servingware container according to claim 7, wherein the paperboard has a basis weight of from 85 lbs/3000 $ft^2$ ream to 115 lbs/3000 $ft^2$ ream.

10. A disposable servingware container press-formed from paperboard comprising:

(a) a bottom panel;

(b) a first annular transition portion extending upwardly and outwardly from the bottom panel defining a first radius of curvature;

(c) an optional sidewall portion extending upwardly and outwardly from the first annular transition portion;

(d) a second annular transition portion flaring outwardly with respect to the first annular transition portion;

(e) an outer flange portion extending outwardly with respect to the second annular transition portion, the container having an outer surface and an inner surface distal to the outer surface, the inner surface being adapted as a serving surface;

(f) wherein the paperboard is infused with a wax composition on one side thereof prior to press-forming said container in an amount of at least 3 lbs of wax per 3000 $ft^2$ ream such that the paperboard has a wax-infused layer enriched with wax proximate one side thereof and a layer undersaturated in wax proximate the other side thereof, and (g) wherein further the wax-infused layer enriched with wax is proximate the outer surface of the container and the layer undersaturated with wax is proximate the inner surface of the container.

11. The disposable servingware container according to claim 10, wherein the paperboard is infused with a wax composition in an amount of up to 30 lbs of wax per 3000 $ft^2$ ream.

12. The disposable servingware container according to claim 10, wherein the paperboard is infused with a wax composition in an amount of from 5 lbs of wax per 3000 $ft^2$ ream up to 20 lbs of wax per 3000 $ft^2$ ream.

13. The disposable servingware container according to claim 10, wherein the paperboard is infused with a wax composition in an amount of from 8 lbs of wax per 3000 $ft^2$ ream up to 15 lbs of wax per 3000 $ft^2$ ream.

14. The disposable servingware container according to claim 10, wherein the paperboard blank has a basis weight from 80 lbs/3000 $ft^2$ ream to 400 lbs/3000 $ft^2$ ream.

15. The disposable servingware container according to claim 10, wherein the paperboard has a basis weight from 90 lbs/3000 $ft^2$ ream to 300 lbs/3000 $ft^2$ ream.

16. The disposable servingware container according to claim 10, wherein the paperboard has a basis weight of more than 150 lbs/3000 $ft^2$ ream.

17. The disposable servingware container according to claim 10, wherein the paperboard has a basis weight of more than 200 lbs/3000 $ft^2$ ream.

18. The disposable servingware container according to claim 10, wherein the wax of the wax composition has a melting point in the range of from 40° C. to 100° C.

19. The disposable servingware container according to claim 10, wherein the wax of the wax composition has a melting point in the range of from 50° C. to 70° C.

20. The disposable servingware container according to claim 10, wherein the wax comprises a paraffin wax.

21. The disposable servingware container according to claim 10, wherein the layer undersaturated in wax is substantially free of sizing other than wax.

22. The disposable servingware container according to claim 10, wherein the paperboard is substantially free of sizing other than wax.

23. The disposable servingware container according to claim 10, wherein the inner surface of the container has a latex coating.

24. The disposable servingware container according to claim 10, wherein the latex coating is a clay coating.

25. The disposable servingware container according to claim 24, wherein there is further provided a finish coating atop the clay coating.

26. The disposable servingware container according to claim 25, wherein the finish coating is an acrylic coating.

27. The disposable servingware container according to claim 10, wherein the container exhibits a Wet Rigidity at least 100% greater than a like container sized with starch instead of wax.

28. The disposable servingware container according to claim 10, wherein the container exhibits a Wet Rigidity at least 150% greater than a like container sized with starch instead of wax.

29. The disposable servingware container according to claim 10, wherein the container exhibits a Wet Rigidity at least 200% greater than a like container sized with starch instead of wax.

30. The disposable servingware container according to claim 10, wherein the container exhibits a Wet Rigidity at least 250% greater than a like container sized with starch instead of wax.

* * * * *